(12) United States Patent
Baker et al.

(10) Patent No.: US 9,834,262 B2
(45) Date of Patent: Dec. 5, 2017

(54) AERODYNAMIC REAR DRAG REDUCTION SYSTEM FOR A TRAILER

(71) Applicant: WABASH NATIONAL, L.P., Lafayette, IN (US)

(72) Inventors: Leonard W. Baker, Lafaytte, IN (US); Brian N. Haan, Lafayette, IN (US); Michael J. Courtney, Dayton, IN (US); James Andrew Sweet, Lafayette, IN (US)

(73) Assignee: Wabash National, L.P., Lafayette, IN (US)

( * ) Notice: Subject to any disclaimer, the term of this patent is extended or adjusted under 35 U.S.C. 154(b) by 0 days.

(21) Appl. No.: 15/141,409

(22) Filed: Apr. 28, 2016

(65) Prior Publication Data

US 2016/0318559 A1  Nov. 3, 2016

Related U.S. Application Data

(60) Provisional application No. 62/154,495, filed on Apr. 29, 2015.

(51) Int. Cl.
*B62D 35/00* (2006.01)
(52) U.S. Cl.
CPC .................. *B62D 35/001* (2013.01)
(58) Field of Classification Search
CPC ........................... B62D 35/001; B62D 35/007
(Continued)

(56) References Cited

U.S. PATENT DOCUMENTS

| 2,933,344 A | 4/1960 | Shumaker |
|---|---|---|
| 3,010,754 A | 11/1961 | Shumaker |

(Continued)

FOREIGN PATENT DOCUMENTS

| DE | 102008036888 | 2/2010 |
|---|---|---|
| EP | 01972339 | 10/1986 |

(Continued)

OTHER PUBLICATIONS

Aerodynamic Trailer Systems, LLC SmartTail® The Trucking Industry's First Totally Automated Trailer Air Spoiler from www.ats-green.com/smarttail.htm (2pages), Jan. 13, 2014.

(Continued)

*Primary Examiner* — Pinel E Romain
(74) *Attorney, Agent, or Firm* — Carli E. Stewart

(57) ABSTRACT

An aerodynamic rear drag reduction system of the present disclosure is configured to be coupled to a rear frame assembly of a trailer including a rear frame and a rear swing door. The drag reduction system includes a side panel configured to be coupled to the rear swing door to extend generally vertically at least partially along a height of the trailer; and a folding mechanism coupled to the side panel. The folding mechanism moves the side panel between (i) a fully-deployed position wherein the side panel is configured to extend generally rearwardly away from the rear end of the trailer and (ii) a fully-stowed position wherein an inner surface of at least a portion of the side panel is configured to lie generally adjacent the rear swing door. The folding mechanism is configured to be coupled to a door locking mechanism of the trailer for movement therefrom.

19 Claims, 20 Drawing Sheets

(58) Field of Classification Search
USPC .................................................. 296/180.4
See application file for complete search history.

(56) References Cited

U.S. PATENT DOCUMENTS

| | | |
|---|---|---|
| 3,276,811 A | 10/1966 | Schmidt |
| 3,596,975 A | 8/1971 | Stephen |
| 3,960,402 A | 6/1976 | Keck |
| 3,999,797 A | 12/1976 | Kirsch et al. |
| 4,142,755 A | 3/1979 | Keedy |
| 4,214,787 A | 7/1980 | Chain |
| 4,309,053 A | 1/1982 | Lett |
| 4,316,630 A | 2/1982 | Evans |
| 4,320,920 A | 3/1982 | Goudey |
| 4,357,045 A | 11/1982 | Kinford, Jr. |
| 4,417,760 A | 11/1983 | Koch |
| 4,421,354 A | 12/1983 | Lemaster |
| 4,671,555 A | 6/1987 | Linz et al. |
| 4,682,808 A | 7/1987 | Bilanin |
| 4,735,381 A | 4/1988 | Wood |
| 4,809,003 A | 2/1989 | Dominek et al. |
| 4,881,772 A | 11/1989 | Feinberg |
| 4,978,162 A | 12/1990 | Labbe' |
| 5,112,120 A | 5/1992 | Wood |
| 5,199,762 A | 4/1993 | Scheele et al. |
| 5,280,990 A | 1/1994 | Rinard |
| 5,374,013 A | 12/1994 | Bassett et al. |
| 5,382,070 A | 1/1995 | Turner |
| 5,498,059 A | 3/1996 | Switlik |
| 5,658,038 A | 8/1997 | Griffin |
| 5,823,610 A | 10/1998 | Ryan et al. |
| 5,901,925 A | 5/1999 | McGrath et al. |
| 5,901,929 A | 5/1999 | Banks |
| 6,092,861 A | 7/2000 | Whelan |
| 6,131,853 A | 10/2000 | Bauer et al. |
| 6,241,302 B1 | 6/2001 | Rehkopf |
| 6,257,654 B1 | 7/2001 | Boivin et al. |
| 6,286,892 B1 | 9/2001 | Bauer et al. |
| 6,485,087 B1 * | 11/2002 | Roberge ................ B62D 35/001 296/180.4 |
| 6,616,218 B2 | 9/2003 | Bauer et al. |
| 6,666,498 B1 | 12/2003 | Whitten |
| 6,685,256 B1 | 2/2004 | Schermer |
| 6,742,616 B2 | 6/2004 | Leban |
| 6,799,791 B2 * | 10/2004 | Reiman ................ B62D 35/004 296/180.1 |
| 6,854,788 B1 | 2/2005 | Graham |
| 6,959,958 B2 | 11/2005 | Basford |
| 6,986,544 B2 | 1/2006 | Wood |
| 7,008,005 B1 | 3/2006 | Graham |
| 7,207,620 B2 | 4/2007 | Cosgrove et al. |
| 7,240,958 B2 | 7/2007 | Skopic |
| 7,255,387 B2 | 8/2007 | Wood |
| 7,318,620 B2 | 1/2008 | Wood |
| 7,374,230 B2 | 5/2008 | Breidenbach |
| 7,431,381 B2 | 10/2008 | Wood |
| 7,484,791 B1 | 2/2009 | Chen |
| 7,537,270 B2 | 5/2009 | O'Grady |
| 7,585,015 B2 | 9/2009 | Wood |
| 7,618,086 B2 | 11/2009 | Breidenbach |
| 7,625,034 B1 | 12/2009 | Fitzgerald |
| 7,641,262 B2 | 1/2010 | Nusbaum |
| 7,699,382 B2 | 4/2010 | Roush |
| 7,740,304 B1 | 6/2010 | Breu |
| 7,748,771 B2 | 7/2010 | Distel et al. |
| 7,765,044 B2 | 7/2010 | Neuburger |
| 7,784,854 B2 | 8/2010 | Breidenbach |
| 7,837,254 B2 | 11/2010 | Reiman et al. |
| 7,845,708 B2 | 12/2010 | Breidenbach |
| 7,850,224 B2 | 12/2010 | Breidenbach |
| 7,854,468 B2 * | 12/2010 | Vogel ................ B62D 35/001 296/180.1 |
| 7,857,376 B2 | 12/2010 | Breidenbach |
| 7,862,102 B1 | 1/2011 | Benton |
| 7,950,720 B2 | 5/2011 | Skopic |
| 7,976,096 B2 | 7/2011 | Holubar |
| 8,007,030 B2 | 8/2011 | Wood |
| 8,025,329 B1 | 9/2011 | Kron |
| 8,025,330 B2 | 9/2011 | Reiman et al. |
| 8,033,594 B2 | 10/2011 | Nusbaum |
| 8,091,951 B1 | 1/2012 | Fitzgerald |
| 8,100,461 B2 | 1/2012 | Smith et al. |
| 8,136,868 B2 | 3/2012 | Nusbaum |
| 8,177,287 B2 | 5/2012 | Vogel et al. |
| 8,196,993 B2 | 6/2012 | Smith et al. |
| 8,196,994 B2 | 6/2012 | Chen |
| 8,196,995 B2 | 6/2012 | Chen |
| 8,235,456 B2 | 8/2012 | Nusbaum |
| 8,251,436 B2 | 8/2012 | Henderson et al. |
| 8,272,680 B2 | 9/2012 | Breidenbach |
| 8,303,025 B2 | 11/2012 | Senatro |
| 8,342,594 B2 | 1/2013 | Benton |
| 8,342,595 B2 | 1/2013 | Henderson et al. |
| 8,360,507 B2 | 1/2013 | Benton |
| 8,360,509 B2 | 1/2013 | Smith et al. |
| 8,360,510 B2 | 1/2013 | Smith et al. |
| 8,382,194 B2 | 2/2013 | Wood |
| 8,480,161 B2 | 7/2013 | Pfaff |
| 8,480,162 B2 | 7/2013 | Breidenbach |
| 8,491,036 B2 | 7/2013 | Henderson et al. |
| 8,492,036 B2 | 7/2013 | Kim |
| 8,579,357 B2 | 11/2013 | Nusbaum |
| 8,608,228 B2 | 12/2013 | Visentin |
| 8,622,461 B2 | 1/2014 | Breidenbach |
| 8,672,391 B1 | 3/2014 | Cobb |
| 8,684,447 B2 | 4/2014 | Henderson et al. |
| 8,697,047 B2 | 4/2014 | LaBuannec et al. |
| 8,708,399 B2 | 4/2014 | Smith et al. |
| 8,746,779 B1 | 6/2014 | Mazyan |
| 8,770,649 B2 | 7/2014 | Praskovsky et al. |
| 8,770,650 B1 | 7/2014 | Brosseau |
| 8,777,297 B2 | 7/2014 | Meredith et al. |
| 8,783,757 B2 | 7/2014 | Henderson et al. |
| 8,876,191 B2 | 11/2014 | Breidenbach |
| 8,973,972 B2 | 3/2015 | Dieckmann et al. |
| 9,056,636 B2 | 6/2015 | Henderson |
| 9,079,623 B2 | 7/2015 | Bernhardt et al. |
| 9,139,238 B2 | 9/2015 | Visser |
| 9,168,959 B2 * | 10/2015 | Smith ................ B62D 35/001 |
| 9,242,683 B2 | 1/2016 | Dieckmann et al. |
| 9,283,996 B2 | 3/2016 | Meredith et al. |
| 9,327,776 B2 | 5/2016 | Dieckmann et al. |
| 9,333,993 B2 | 5/2016 | Telnack |
| 9,346,496 B2 | 5/2016 | Breidenbach |
| 9,371,097 B1 | 6/2016 | Conny |
| 9,409,609 B2 | 8/2016 | Camosy |
| 9,440,688 B2 | 9/2016 | Smith et al. |
| 9,457,847 B2 | 10/2016 | Smith et al. |
| 2007/0089531 A1 | 4/2007 | Wood |
| 2008/0116715 A1 | 5/2008 | Steel |
| 2008/0157560 A1 | 7/2008 | Spector |
| 2009/0026797 A1 | 1/2009 | Wood |
| 2009/0236872 A1 | 9/2009 | Wood |
| 2010/0106380 A1 | 4/2010 | Salari et al. |
| 2010/0194144 A1 | 8/2010 | Sinha |
| 2011/0115254 A1 | 5/2011 | Skopic |
| 2012/0126572 A1 | 5/2012 | Hjelm et al. |
| 2012/0292495 A1 | 11/2012 | Hashimoto et al. |
| 2013/0076063 A1 | 3/2013 | Ryan et al. |
| 2013/0076064 A1 | 3/2013 | Smith et al. |
| 2013/0106136 A1 | 5/2013 | Smith et al. |
| 2013/0175824 A1 | 7/2013 | Smith et al. |
| 2013/0214557 A1 | 8/2013 | Smith et al. |
| 2014/0019010 A1 | 1/2014 | Smith et al. |
| 2014/0117713 A1 * | 5/2014 | Baker ................ B62D 35/001 296/180.4 |
| 2015/0035312 A1 | 2/2015 | Grandominico et al. |
| 2015/0166129 A1 | 6/2015 | Camosy |
| 2015/0329152 A1 * | 11/2015 | Baker ................ B62D 35/001 296/180.4 |
| 2016/0046333 A1 | 2/2016 | Baker |
| 2016/0068200 A1 | 3/2016 | Dieckmann et al. |
| 2016/0152285 A1 | 6/2016 | Wiegel |
| 2016/0152286 A1 | 6/2016 | Meredith et al. |

(56) References Cited

U.S. PATENT DOCUMENTS

| | | |
|---|---|---|
| 2016/0185399 A1 | 6/2016 | Smith et al. |
| 2016/0185401 A1 | 6/2016 | Breidenbach |
| 2016/0251040 A1 | 9/2016 | DeBock et al. |
| 2016/0304138 A1 | 10/2016 | Dieckmann et al. |
| 2016/0325792 A1* | 11/2016 | Telnack ............... B62D 35/007 |
| 2016/0332680 A1 | 11/2016 | Dieckmann et al. |
| 2016/0347380 A1 | 12/2016 | Dieckmann et al. |
| 2017/0021873 A1 | 1/2017 | Dieckmann et al. |

FOREIGN PATENT DOCUMENTS

| | | |
|---|---|---|
| WO | WO/2013/188669 | 12/2013 |
| WO | WO/2016/045767 A1 | 3/2016 |

OTHER PUBLICATIONS

Kodiak Innovations—"Bumper Bullet" from www.slipstreemaero.com (2 pages), Jan. 13, 2014.

Aerovolution—Revolutionary Inflatable Aerodynamic Solutions from www.aerovolution.com/information.shtml (2 pages), Oct. 13, 2014.

SmartTruck New Product Release: Low Profile Side Fairings Changing the Shape of Trucking, slide show for Mid-America Trucking Show, (7 pages), Mar. 21-23, 2013.

Trailer Fairings Be Road Smart from www.beroadsmart.com/Vortex_Generators-2.html (2 pages), Jan. 9, 2014.

Solus Aero Package from www.solusinc.com/aero.html (2 pages), Jan. 9, 2014.

Slipsteem Aerodynamics Homepage www.slipstreemaero.com (1 page).

Spoiler from www.ats-green.com/smarttail.htm (2 pages), May 8, 2015.

PCT /US2013/045661 International Search Report dated Nov. 14, 2013 (2 pages).

PCT/US2013/045661 Written Opinion of the International Searching Authority (dated Nov. 14, 2013 (5 pages).

PCT/US2013/045661 International Preliminary Report on Patentability dated Nov. 14, 2013 (6 pages).

U.S. Office Action on U.S. Appl. No. 14/928,056 dated Jan. 27, 2016 (10 pages).

U.S. Office Action on U.S. Appl. No. 14,407,674 dated Feb. 17, 2016 (10 pages).

Office Action U.S. Appl. No. 14/049,506 dated Jul. 1, 2014 (9 pages).

Office Action U.S. Appl. No. 14/049,506 dated Feb. 24, 2015 10 pages).

Office Action U.S. Appl. No. 14/709,980 dated Jun. 16, 2016 (12 pages).

Office Action U.S. Appl. No. 14/928,056 dated Jul. 5, 2016 (9 pages).

EP 13803764 Supplementary European Search Report and Written Opinion of the Supplementary European Search Report , dated Jan. 26, 2016 (6 pages).

Photograph 1 of the Wabco OptiFlow device taken at IAA convention in Germany on Sep. 28, 2014.

Photograph 2 of the Wabco OptiFlow device taken at IAA convention in Germany on Sep. 28, 2014.

Photograph 3 of the Wabco OptiFlow device taken at IAA convention in Germany on Sep. 28, 2014.

Photograph 4 of the Wabco OptiFlow device taken at IAA convention in Germany on Sep. 28, 2014.

Photograph 5 of the Wabco OptiFlow device taken at IAA convention in Germany on Sep. 28, 2014.

Photograph 6 of the Wabco OptiFlow device taken at IAA convention in Germany on Sep. 28, 2014.

Photograph 7 of the Wabco OptiFlow device taken at IAA convention in Germany on Sep. 28, 2014.

Photograph 8 of the Wabco OptiFlow device taken at IAA convention in Germany on Sep. 28, 2014.

Article at http://ir.wabco-auto.com published Sep. 23, 2014 "WABCO Debuts OptiFlow Tail at IAA Commercial Vehicles 2014; Latest Aerodynamic Product Enables Trailer Manufacturers and Fleets in Europe to Improve Fuel Economy and Operational Efficiency" (3 pages).

* cited by examiner

AERODYNAMIC REAR DRAG REDUCTION SYSTEM FOR A TRAILER

This application claims priority under 35 U.S.C. §119(e) to U.S. Provisional Patent Application Ser. No. 62/154,495 filed Apr. 29, 2015 entitled AERODYNAMIC REAR FAIRING SYSTEM FOR A TRAILER, the entirety of which is hereby incorporated by reference herein.

This application cross-references U.S. Pat. No. 9,199,673 issued Dec. 1, 2015 and titled AERODYNAMIC REAR DRAG REDUCTION SYSTEM FOR A TRAILER; U.S. application Ser. No. 14/928,056 filed Oct. 30, 2015 and titled AERODYNAMIC REAR DRAG REDUCTION SYSTEM FOR A TRAILER; U.S. application Ser. No. 14/709,980 filed May 12, 2015 and titled AERODYNAMIC REAR DRAG REDUCTION SYSTEM FOR A TRAILER; U.S. application Ser. No. 14/407,674 filed Dec. 12, 2014 and titled WAKE CONVERGENCE DEVICE FOR A VEHICLE; and U.S. application Ser. No. 15/044,220 filed Feb. 16, 2016 and titled AERODYNAMIC REAR DRAG REDUCTION SYSTEM FOR A TRAILER, the entirety of each of which is incorporated by reference herein.

FIELD OF THE INVENTION

The present invention relates generally to an aerodynamic rear fairing or drag reduction system for reducing drag on a vehicle such as a van-type trailer or truck body, for example.

BACKGROUND OF THE INVENTION

To reduce wind flow resistance and drag on a trailer, truck, semitrailer, or other vehicle, side skirts which extend downwardly from a bottom of the trailer and/or chassis toward the roadway to partially enclose the floor assembly and undercarriage of the trailer, fairings and other such structures have been used. Many structures associated with the rear of the trailer are provided in order to also reduce the aerodynamic drag on the trailer.

A typical storage container of a trailer terminates with a large, rectangular rear surface. This shape causes an area of reduced pressure to be created behind the trailer storage container as it moves over the highway, thus generating a slowing force that must be overcome with additional engine power and thus additional fuel. In other words, turbulent air flow passing behind the vehicle imparts a drag force to the vehicle. Rear trailer fairings are designed to streamline the rear end of the trailer in order to control the flow of air at the rear of the vehicle. Such reduction on the drag of the ground vehicle may operate to conserve fossil fuels as well as other sources of vehicle drive power for hybrid vehicles, battery-operated vehicles, and alternative fuel-based vehicles, for example. However, many such fairings which extend from the rear end of the trailer also may cover the rear doors of the trailer which must be opened and closed by a user to load and unload the cargo within the storage area of the trailer in such a way that users may be required to dismount and mount, or otherwise manually operate, the fairing(s) each time a loading or unloading operation is to be performed.

SUMMARY

The present invention may comprise one or more of the features recited in the attached claims, and/or one or more of the following features and combinations thereof.

According to one aspect of the present disclosure, an aerodynamic rear drag reduction system is to be coupled to a rear frame assembly of a trailer including a rear frame and a rear swing door. The drag reduction system includes a side panel configured to be coupled to the rear swing door to extend generally vertically at least partially along a height of the trailer, and a folding mechanism coupled to the side panel to move the side panel between (i) a fully-deployed position wherein the side panel is configured to extend generally rearwardly away from the rear end of the trailer and (ii) a fully-stowed position wherein an inner surface of at least a portion of the side panel is configured to lie generally adjacent the rear swing door. The folding mechanism is configured to be coupled to a door locking mechanism of the trailer for movement therewith.

In one illustrative embodiment, the folding mechanism may be automatically actuated as a result of movement of the door locking mechanism.

In another illustrative embodiment, movement of a handle of the door locking mechanism from a locked position to an unlocked position may automatically moves the side panel form the fully-deployed position to the full-stowed position.

In yet another illustrative embodiment, the folding mechanism may be configured to be coupled to a lock-rod of the door locking mechanism. Further illustratively, rotational movement of the lock-rod may automatically actuate the folding mechanism.

In still another illustrative embodiment, the folding mechanism may include (i) a first linkage assembly configured to be coupled to a vertical lock-rod of a door locking mechanism, (ii) a vertically-extending deployment rod coupled to the first linkage assembly, and (iii) a second linkage assembly coupled at one end to the vertically-extending deployment rod and at another end to the side panel. Illustratively, the second linkage assembly may include (i) a first link coupled to the deployment rod for rotational movement therewith, and (ii) a second link pivotably coupled at a first end to the first link and pivotably coupled at a second end to the side panel.

In yet another illustrative embodiment, the aerodynamic rear drag reduction system may also include a top panel configured to be coupled to a top portion of the rear swing door of the trailer to extend generally horizontally at least partially along a top portion of the rear frame assembly of the trailer. Illustratively, the top panel may be movable between (i) a fully-deployed position wherein the top panel is configured to extend generally rearwardly away from the rear end of the trailer and a top edge of the side panel is spaced inwardly from an outer edge of the top panel and (ii) a fully-stowed position wherein the top panel is configured to lie generally adjacent to an outer surface of the side panel. Further illustratively, the folding mechanism may include a support arm engaged with a bottom surface of the top panel when the top panel is in the fully-deployed position. Further, the top panel may be positioned on top of the side panel and the bottom surface of the top panel may engages the outer surface of the side panel when the top and side panels are each in the fully-stowed positions.

According to another aspect of the present disclosure, an aerodynamic rear drag reduction system configured to be coupled to a rear frame assembly of a trailer including a rear frame and a rear swing door includes a top panel, a side panel, and a folding mechanism. The top panel is configured to be coupled to the rear swing door of the trailer to extend generally horizontally at least partially along a width of the trailer. The side panel is configured to be coupled to the rear swing door to extend generally vertically at least partially along a height of the trailer. The folding mechanism is directly engaged with the top panel and the side panel and configured to move the top and side panels between a fully-deployed position wherein the top and side panels are configured to extend generally rearwardly away from the rear end of the trailer and a fully-stowed position wherein the top and side panels are configured to lie generally adjacent the rear swing door. Illustratively, the top panel is supported by both the side panel and the folding mechanism when the top panel is in the fully-deployed position, and an outer surface of the side panel is spaced inwardly from an outer edge of the top panel when the top panel is in the fully-deployed position.

In one illustrative embodiment, a support arm of the folding mechanism may move along a bottom surface of the top panel as top panel moves between the fully-deployed and fully-stowed positions.

In another illustrative embodiment, the folding mechanism may include (i) a vertical deployment rod configured to be coupled to a vertical lock-rod of a door locking mechanism of the trailer for rotational movement with the lock-rod, and (ii) a linkage assembly coupled to the deployment rod and the side panel to move the side panel between the fully-deployed and fully-stowed positions. Illustratively, linkage assembly may include (i) a first link rigidly coupled at one end to the deployment rod for rotational movement therewith and (ii) a second link pivotably coupled at a first end to the distal end of the first link and pivotably coupled at a second end to the side panel. Further, the first link may extend generally rearwardly and the second link extends generally horizontally when the side panel is in the fully-deployed position. Illustratively, the second link may be configured to push against the side panel when the lock-rod is rotated in a counter-clockwise direction. The linkage assembly may also be configured to support the top panel thereon when the top panel is in the fully-deployed position. Illustratively, rotation of the lock-rod may cause rotation of the vertical deployment rod, and rotation of the vertical deployment rod urges the linkage assembly to move the side panel between the fully-stowed and fully-deployed positions.

In another illustrative embodiment, the aerodynamic rear drag reduction system may also include a limit strap coupled at one end to the side panel and configured to be coupled at another end to the rear frame assembly of the trailer. Illustratively, the limit strap may prevent the side panel from moving beyond a predetermined location when in the fully-deployed position.

In yet another illustrative embodiment, the aerodynamic rear drag reduction system may also include a bumper coupled to the side panel and configured to engage the linkage assembly when the side panel is in the fully-stowed position. Illustratively, the bumper may be configured to maintain a minimum angle between the side panel and the linkage assembly when the side panel is in the fully-stowed position.

According to still another aspect of the present disclosure, a method of operating a rear drag reduction system configured to be coupled to a rear frame assembly of a trailer including a rear frame and a rear swing door includes automatically moving a top panel of the rear drag reduction system and a side panel of the rear drag reduction system from a fully-deployed position wherein the top and side panels are configured to extend generally reawarwadly away from the rear end of the trailer to a fully-stowed position wherein the top and side panels are configured to lie generally adjacent the rear portion of the trailer upon movement of a door locking mechanism of the trailer from a locked position to an unlocked position.

BRIEF DESCRIPTION OF THE DRAWINGS

FIGS. 5A-8 are rear perspective views of one of the drag reduction systems of FIGS. 1-4 moving from a fully-deployed position to a fully-stowed position by rotational movement of a lock-rod of the door locking mechanism of the trailer.

FIG. 5A shows the drag reduction system in the fully-deployed position showing both the top panel and the side panel in fully-deployed positions.

FIG. 6 shows the lock-rod of the door locking mechanism of the trailer having been rotated in the counterclockwise direction toward an unlocked position (in order to allow a user to unlock the rear swing doors of the trailer) to similarly cause counterclockwise rotation of the vertical deployment rod that is coupled via a linkage assembly to the lock-rod in order to rotate the upper support arm as well as two other side linkage assemblies approximately 100 degrees from a first, rearwardly-extending, or deployed, position to a second, stowed or out-of-the-way position to move the side panel and the top panel to their fully-stowed positions.

FIG. 7 shows the side and top panels pivoting toward their fully-stowed positions as the support arm and side linkage assemblies continue to move toward their second position due to continued counterclockwise rotation of the lock-rod.

FIG. 8 shows the side and top panels in their fully-stowed positions with the side panel adjacent the rear swing door and the top panel folded over the side panel.

FIG. 9 is a rear perspective view of the trailer showing the drag reduction system in the fully-stowed position and showing the rear swing door of the trailer being moved toward a fully-opened position.

FIG. 10 is a rear perspective view of the trailer similar to FIG. 9 showing the rear swing door moved further toward the fully-opened position.

FIG. 11 is a rear perspective view of the trailer similar to FIGS. 9 and 10 showing the rear swing door moved still further toward the fully-opened position.

FIG. 12 is a side perspective view of the rear portion of the trailer of FIGS. 9-11 showing the side panel and top panel moving with the rear swing door toward its fully-opened position.

FIG. 13 is a side perspective view of the rear portion of the trailer of FIGS. 9-12 showing the rear swing door in the fully-opened position and the rear drag reduction system in its fully-stowed position located between the rear swing door and the sidewall of the trailer.

FIG. 16 is a perspective view showing a pull-tab of the manual release mechanism having been removed from within a slot of the second link.

FIG. 17 is a perspective view showing the second link moving to the right relative to the first link to rotate the deployment rod.

FIG. 18 is a perspective view showing the second link having moved all the way to the right relative to the first link in order to rotate the deployment rod and lower the top panel without having to rotate, or otherwise operate, the vertical lock-rod of the door locking mechanism.

DETAILED DESCRIPTION OF THE PREFERRED EMBODIMENT

For the purposes of promoting an understanding of the principles of the invention, reference will now be made to illustrative embodiments shown in the attached drawings and specific language will be used to describe the same. While the concepts of this disclosure are described in relation to a truck trailer, it will be understood that they are equally applicable to other vehicles generally, and more specifically to conventional flat-bed and/or box or van type trailers, examples of which include, but should not be limited to, straight truck bodies, small personal and/or commercial trailers and the like. Accordingly, those skilled in the art will appreciate that the present invention may be implemented in a number of different applications and embodiments and is not specifically limited in its application to the particular embodiments depicted herein.

Figure 1:
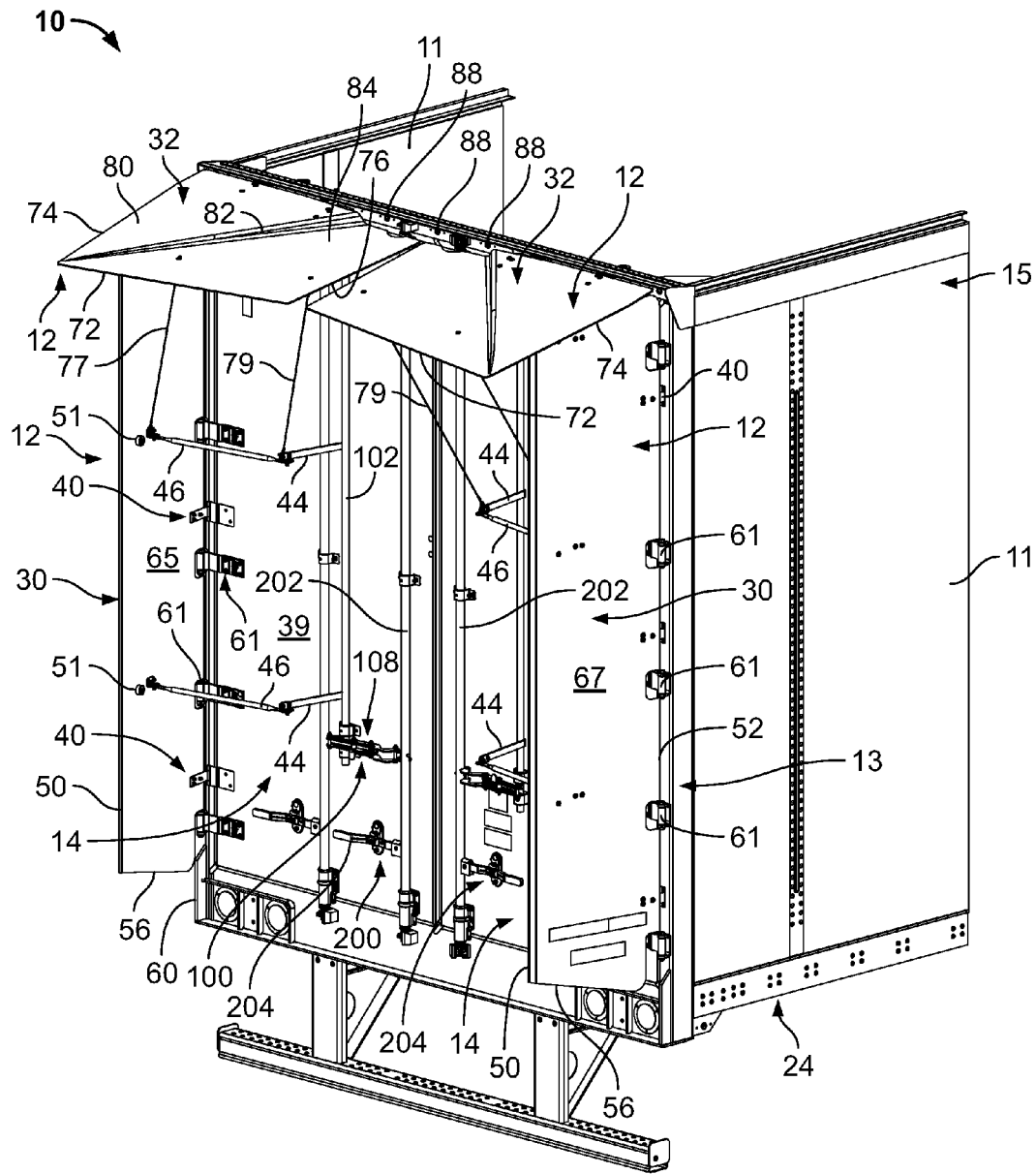
FIG. 1 is a rear perspective view of a rear end portion of a trailer showing a right and left aerodynamic rear drag reduction system of the present disclosure each in a fully-deployed position.

Looking first to FIG. 1, a trailer 10 includes an aerodynamic rear drag reduction system 12 coupled to the rear frame assembly (including a rear frame 13 and rear doors 14 coupled to the rear frame 13) of the trailer 10. Illustratively, the drag reduction system 12 operates to improve the aerodynamic efficiency of the trailer 10 by reducing drag and turbulent wind flow behind the rear end of the trailer 10. In particular, the drag reduction system 12 operates to reduce turbulent airflow immediately behind the trailer 10 as the trailer 10 is traveling down the road. The turbulent airflow immediately behind the rear end of the trailer 10 is reduced because the drag reduction system 12 channels and controls the flow of air from the sides and top of the trailer 10 over the rear end of the trailer 10. This reduction of turbulent airflow behind the trailer 10 may increase the fuel efficiency, or the efficiency of any other source of vehicle drive power, of the tractor/trailer combination.

Illustratively, the drag reduction system 12 extends behind the rear frame 13 and rear doors 14 of the trailer 10. As is further discussed in additional detail below, the drag reduction system 12 is movable relative to the rear doors 14 of the trailer 10 between a fully-deployed, or use, position (shown in FIG. 1), and a fully-closed, or stowed position (shown in FIGS. 8 and 9-13). The drag reduction system 12 is also movable with the rear swing doors 14 of the trailer 10 when in the fully-stowed position as the doors 14 are moved to their fully-opened position shown I FIG. 13. As shown in FIG. 1, the trailer 10 includes a storage container 15 configured to carry cargo therein. The storage container 15 includes sidewalls 11, a front end wall (not shown), the rear frame assembly (including the rear frame 13 and doors 14), a roof (not shown), and a floor assembly 24 which all cooperate together to define an inside storage portion of the container 15 that is able to store various articles or goods therein. The front end of the trailer 10 is configured to be coupled to a tractor (not shown) for towing the trailer 10 thereon, thus providing a tractor-trailer assembly. It should be understood that while the aerodynamic drag reduction system 12 is shown for use with a trailer 10, the drag reduction system 12 may be coupled to any vehicle or storage container to reduce the drag thereon.

Illustratively, the trailer 10 includes two drag reduction systems 12, as shown in FIG. 1. In particular, one system 12 is coupled to one rear swing door 14 of the trailer 10, while the other system 12 is coupled to the other rear swing door 14 of the trailer 10. For the purposes of the description herein, however, only the left drag reduction system 12 will be described herein. However, it should be understood that the two drag reduction systems 12 of the trailer 10 are identical in configuration and function.

As shown in FIGS. 1-13, the drag reduction system 12 includes a side panel 30 and a top panel 32. As shown in FIG. 1 and discussed in greater detail below, the side panel 30 is generally vertically-oriented and is hingedly coupled to the left rear swing door 14. The top panel 32 is generally horizontally-oriented and is hingedly coupled to a top portion of the left rear swing door 14. As is discussed in greater detail below, the top panel 32 is engaged with, and at least partially supported by, a top edge 54 of the side panel 30 when the rear drag reduction system 12 is in the fully-deployed position shown in FIG. 1. As is discussed in greater detail below, the drag reduction system 12 is configured to automatically move from the fully-deployed position shown in FIG. 1 to the fully-stowed position shown in FIGS. 8 and 9-13 when a user unlocks a door locking mechanism 200 of the trailer 10. Once the drag reduction system 12 is in the fully-stowed positioned, a user may open the rear swing door 14 to its fully-opened position (shown in FIG. 13) adjacent the side wall 11 of the trailer 10. Further, the drag reduction system 12 is configured to automatically move from the fully-stowed position shown in FIG. 8 to the fully-deployed position shown in FIG. 1 (when the rear swing door 14 of the trailer 10 is in the closed position) when the user engages, or locks, the door locking mechanism 200 associated with the trailer 10. As further discussed herein, the rear drag reduction system 12 includes a manual override mechanism 139 which allows a user to manually move the rear drag reduction system 12 from its fully-deployed position to its fully-stowed position without unlocking or otherwise manipulating the door locking mechanism 200 of the trailer 10.

Figure 3A:
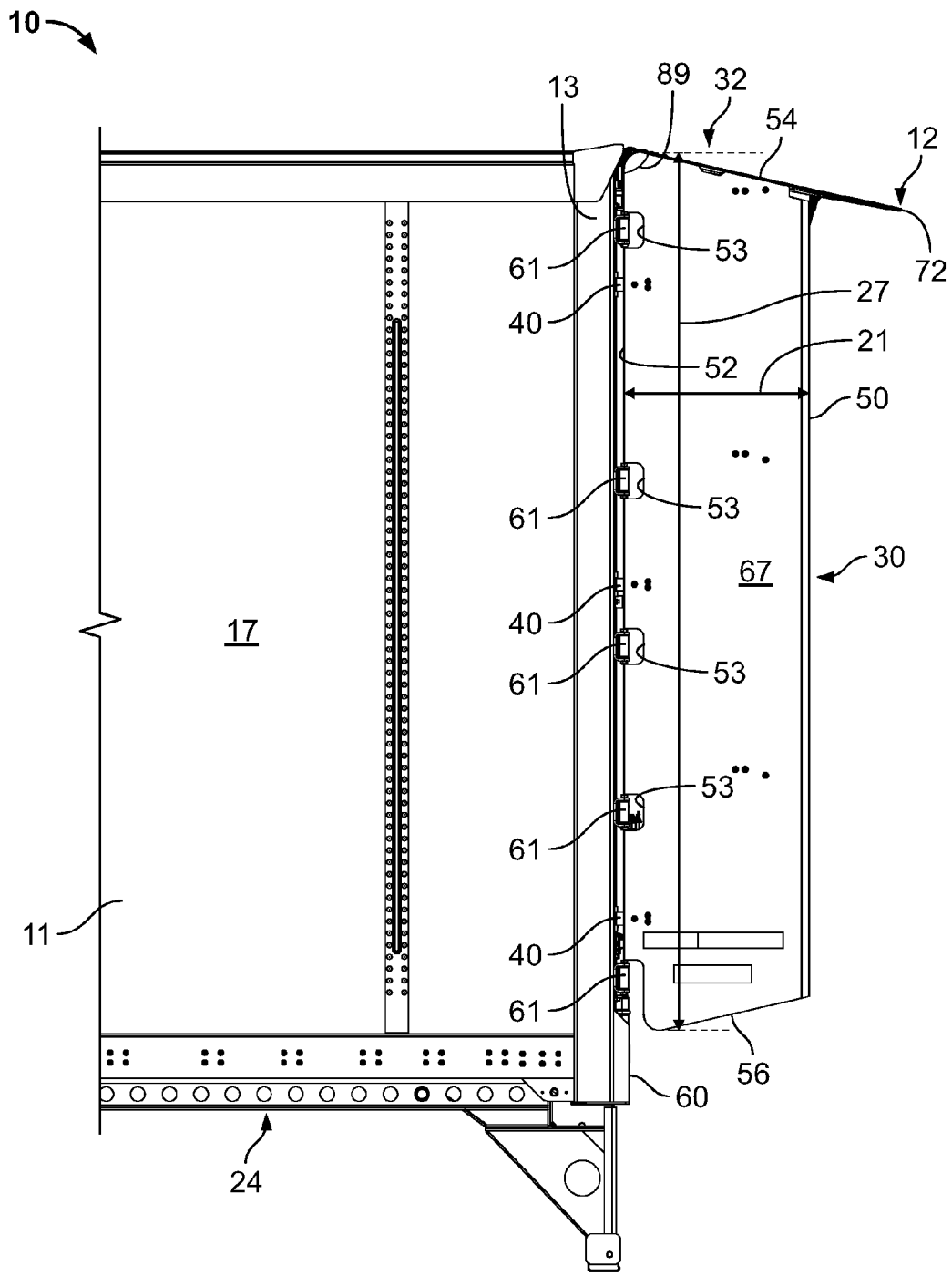
FIG. 3A is a side view of one of the drag reduction systems of FIGS. 1, 2A, and 2B.

As shown in FIG. 3A, the side panel 30 extends along a height of the trailer 10. Illustratively, a height of the side panel 30 is substantially the same as a height of the rear frame 13 of the trailer 10. It should be understood, however, that the side panel 30 may be any suitable height greater than, equal to, or less than a height of the rear frame 13 and may be located at any position along a height of the rear frame 13 of the trailer 10. Illustratively, an overall height 27 of the side panel 30 is approximately 111 inches while an overall width 21 of the side panel 30 is approximately 24 inches. Illustratively, the height 27 of the side panel 30 is measured a vertical distance between a highest point of the side panel 30 and a lowest portion of the side panel as shown in FIG. 3A. The width 21 is measured as the greatest horizontal distance between the forward edge 52 and the rearward edge 50 of the side panel.

The side panel 30 includes a rearward edge 50, a forward edge 52, a top edge 54, and a bottom edge 56. Illustratively, the forward and rearward edges 52, 50 are generally vertical (and thus parallel to each other) while the top and bottom edges 54, 56 are angled relative to each other. The top edge 54 is angled downwardly from the forward edge 52 to the rear edge 50 while the bottom edge 56 is angled upwardly from the forward edge 52 to the rearward edge 50, as shown in FIG. 3A. The top angle is approximately 12 degrees to coincide with the downward angle 89 of the top panel 32 as is discussed in greater detail below. The top panel 32 is supported at least in part by the upper edge 54 of the side panel 30; as such, the upper edge 54 of the side panel 30 and the top panel 32 are configured to be similarly angled downwardly. The bottom edge 56 of the side panel 30 is illustratively angled upwardly from the forward edge 52 to the rearward edge 50. Such an upward angle may assist in providing increased visibility for the bumper lights 99 of the trailer 10 to illuminate upwardly. It should be understood that while the top and bottom edges 54, 56 of the side panel 30 are both shown to be angled approximately 12 degrees, each of the top and bottom edges 54, 56 may be angled the same as or differently from one another and may be angled any suitable degree including an angle of zero degrees from a horizontal axis. Illustratively, both the forward edge 52 and the rearward edge 50 are located rearward of the rear end 60 of the trailer 10 when the rear drag reduction device 12 is in the fully-deployed position. As such, the entire side panel 30 is positioned rearward of the rear edge 60 of the trailer 10 when the side panel 30 is in the fully-deployed position.

Figure 4:
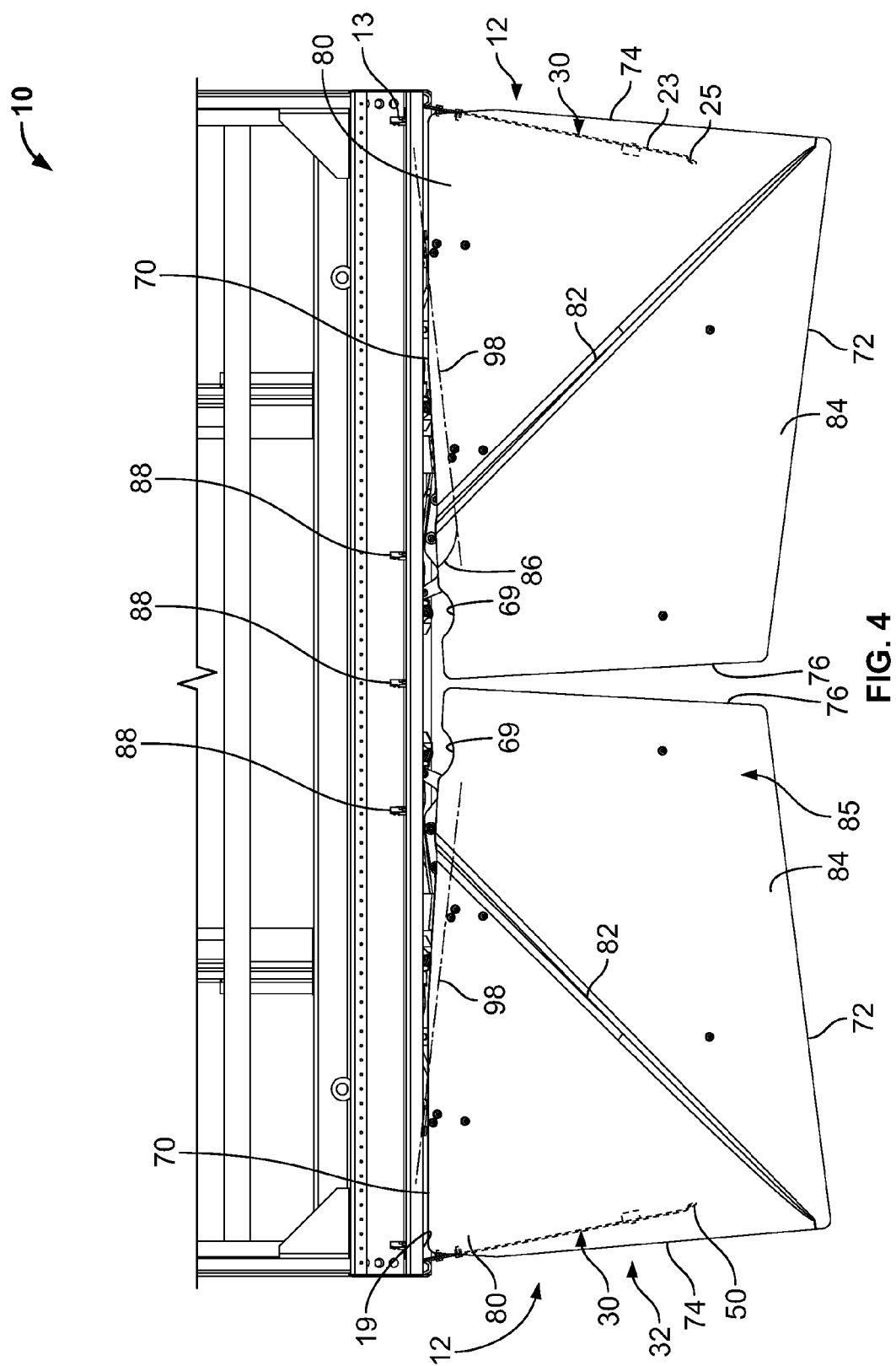
FIG. 4 is top view of the drag reduction systems of FIGS. 1-3B showing the top panels each including an upper/outer portion, a diagonal step, and a lower/inner portion, and showing the side panels (in phantom) positioned below and supporting the respective top panel thereon.

Illustratively, the side panel 30 is angled inwardly by approximately 11 degrees from a plane parallel to the sidewall 11 of the trailer, as shown by the angle 91 in FIG. 4. As such, the side panel 30 is positioned inward of the outer edge 74 of the top panel 32 to allow the top panel 32 to rest on the upper edge 54 of the side panel 30 while a portion of the top panel 32 is positioned outwardly from a plane defined by the outer surface 67 of the side panel 30. However, it should be understood that the side panel 30 may be generally parallel to the side wall 11 of the trailer, or may be angled by any suitable degree greater or lesser than that which is shown in FIG. 4. Further illustratively, the side panel 30 is not positioned to extend outwardly beyond a plane defined generally by the side wall 11 of the trailer 10 when the rear drag reduction system 12 is in the fully-deployed position. In other words, the side panel 30 is positioned inwardly of any plane defined by the side wall 11 of the trailer 10. However, it is within the scope of this disclosure to position the side panel 30, or any portion thereof, outwardly from the sidewall 11 when in the fully-deployed position as well.

Figure 3B:
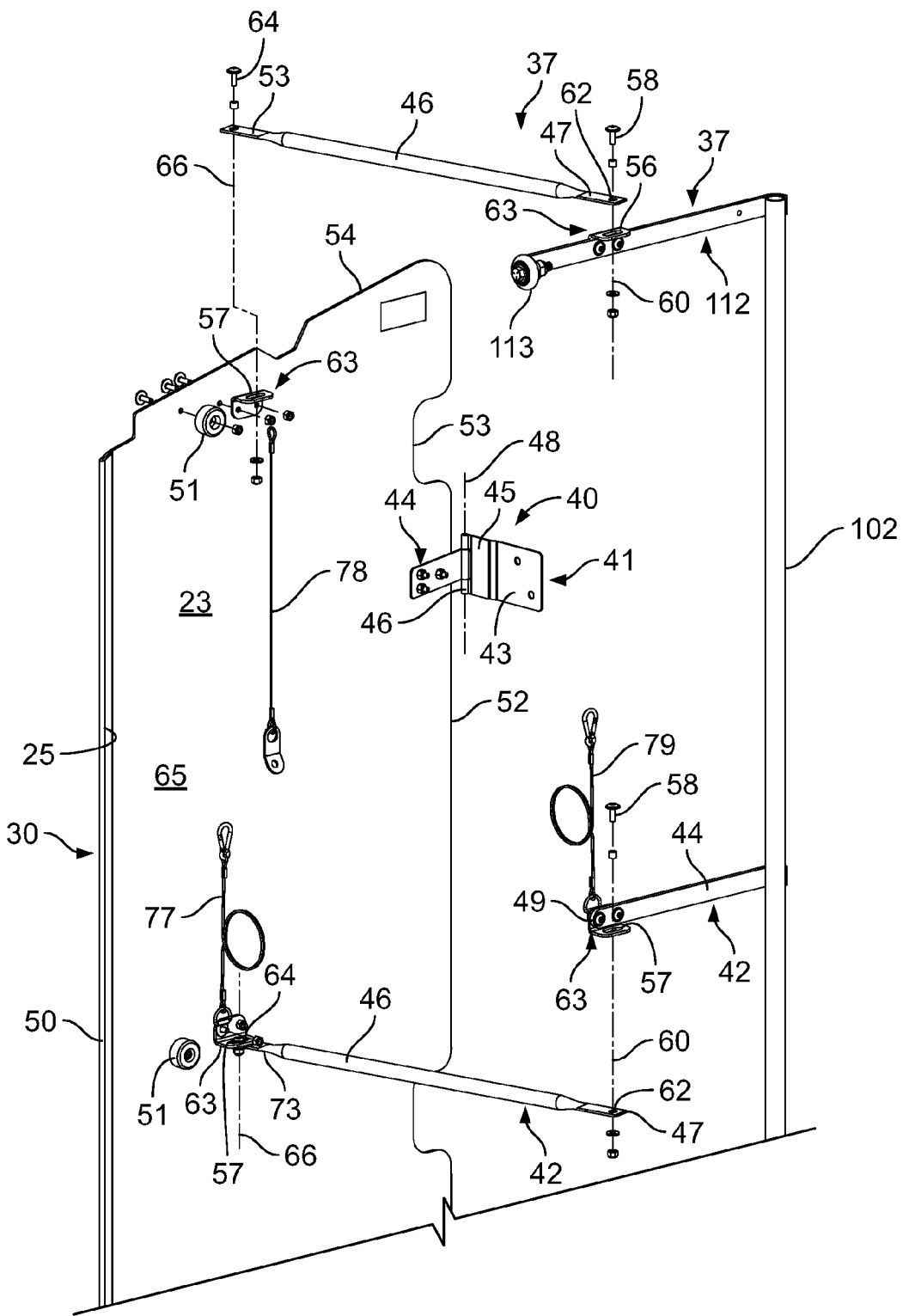
FIG. 3B is an exploded, perspective view of a portion of the side panel and showing an upper portion of a folding mechanisms including side linkage assemblies pivotably coupling the side panel to a vertical deployment rod actuated via movement of a door locking mechanisms of the trailer.

As shown in FIGS. 1, 3A, and 3B the side panel 30 of the drag reduction system 12 is coupled to the rear swing door 14 via hinges 40. Illustratively, three sets of hinges 40 are provided to couple the side panel 30 to the rear swing door 14; however, it should be understood that any suitable number of hinges may be provided. Each hinge 40 includes first hinge plate 41 coupled to the outer surface of the rear door 14, a second hinge plate 44, and a hinge joint 46 coupled to each of the first and second hinge plates 40, 41 to define a hinge axis 48 about which the side panel 30 is able to pivot when moving between the fully-deployed and fully-stowed positions. Illustratively, the first hinge plate 41 includes a portion 43 coupled directly to the door 14 via fasteners such as bolts, screws, rivets, and/or adhesive, for example, and an offset portion 45 which extends beyond an outer vertical edge of the door 14 to position the hinge joint 46 generally adjacent to the vertical member of the rear frame 13.

Further illustratively, the forward edge 52 of the side panel 30 includes notches 53 formed therein. Illustratively five notches 53 are formed in the forward edge 52 to accommodate the hinges 61 of the door assembly which couple the rear swing door 14 to the rear frame 13 for pivoting movement about the frame 13 from the fully-closed position to a fully-opened position, such as that shown in FIG. 13 for example. Thus, each notch 53 of the side panel 30 corresponds to and is positioned adjacent a respective hinge 61 of the door assembly of the trailer 10. Illustratively, the hinge axis defined by the hinges 61 of the door 14 and the hinge axis 48 of the hinges 40 of connecting the side panel 30 to the door 14 are parallel to and spaced-apart from each other. In particular, the hinge axis 48 is positioned inwardly and forwardly from the hinge axis of the door hinges 61 to position the hinge axis 48 closer to the outer edge and outer surface 39 of the door 14.

Illustratively, as shown in FIG. 3B, the rearward edge 50 of the side panel 30 is folded, or hemmed, in order to stiffen the panel 30 and reduce any potential flapping or wobbling of the side panel 30 as the trailer 10 travels down the highway. Illustratively, this hemmed portion of the side panel 30 further defines a bend along a vertical axis thereof resulting in two different planar surfaces 23, 25 as shown in FIGS. 3B and 4. Illustratively, the second planar surface 25 is angled inwardly approximately 20 degrees from the first planar surface 23 in order to further direct the flow of air around and behind the trailer 10. As shown in FIG. 4, the side panel 30 is positioned inwardly of the outer edge 74 of the top panel 32 such that an outer portion of the top panel 32 (located inside the outer edge 74 of the top panel) is positioned on and engaged with the top edge 54 of the side panel 30. In particular, the top edge 54 of the side panel 30 is positioned inwardly, and spaced-apart from, of the outer edge 74 of the top panel 32. It should be understood that while the illustrative side panel 30 includes the two planar surfaces 23, 25 angled approximately 20 degrees from each other, it is within the scope of this disclosure to provide a side panel having only a single planar surface as well as a side panel having two or more angled surfaces which are each positioned at any suitable angle relative to each other.

Figure 2A:
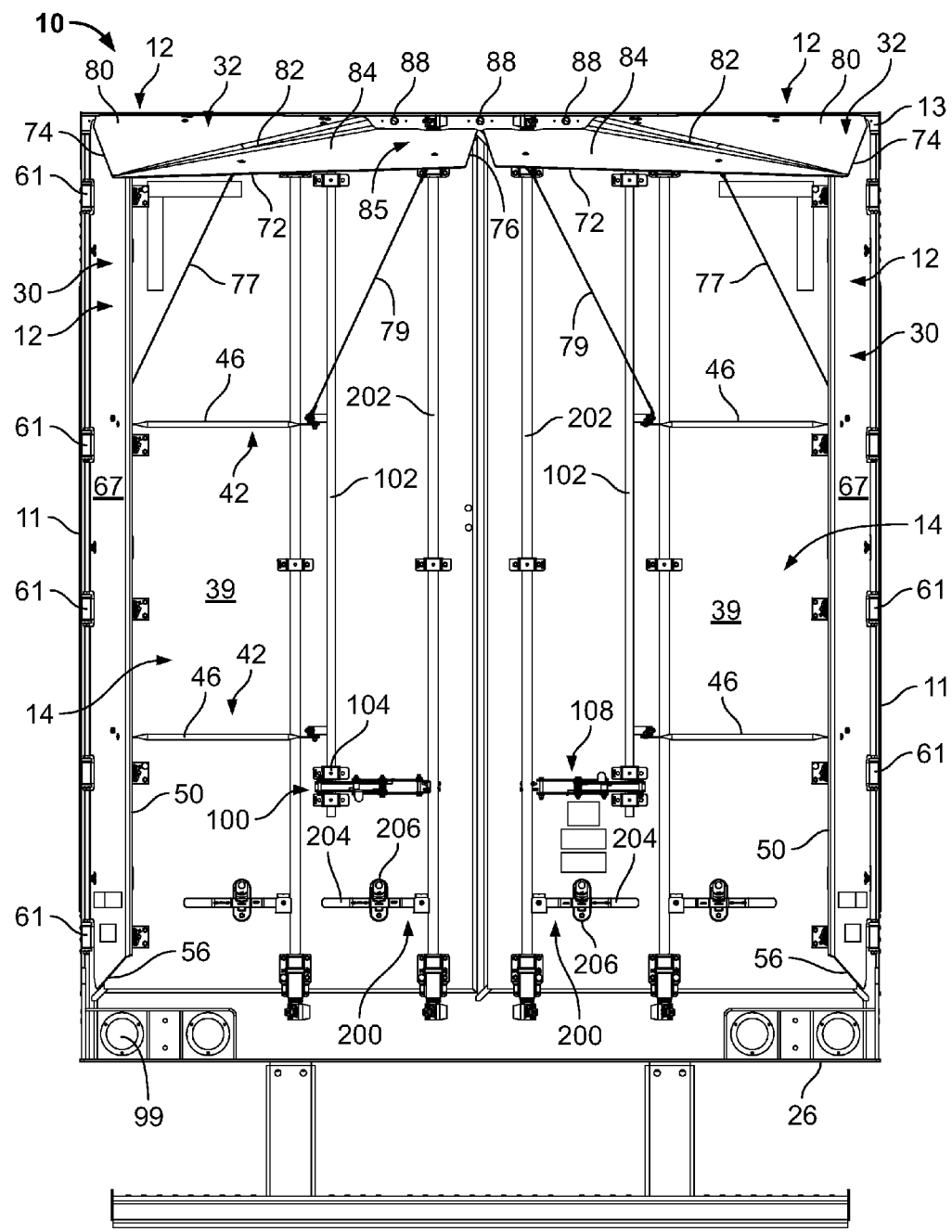
FIG. 2A is a rear view of the drag reduction systems of FIG. 1, each including a side panel and a top panel coupled to the rear swing door of the trailer for movement therewith.
Figure 2B:
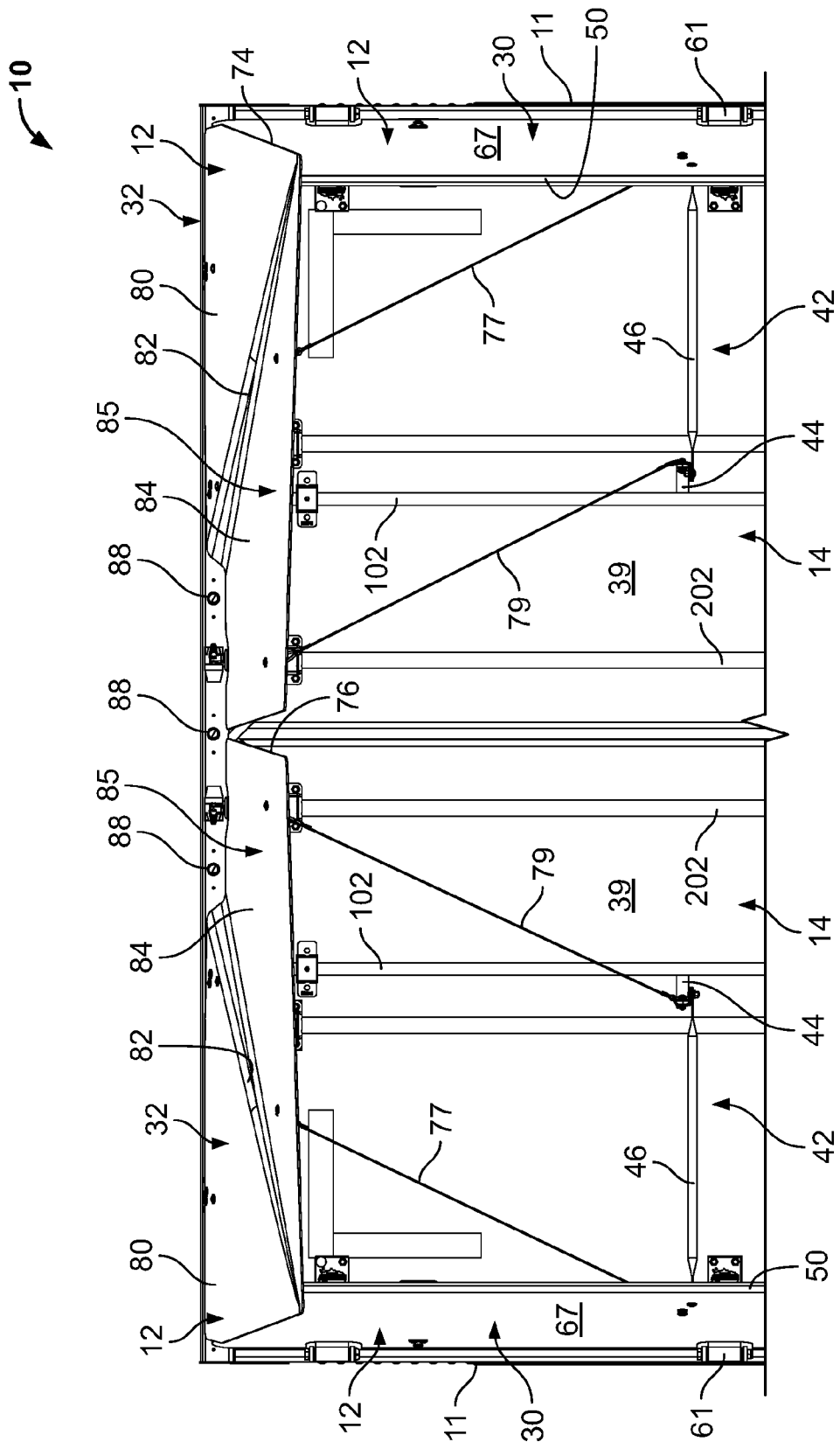
FIG. 2B is an enlarged, rear view of the top panel and upper portion of the side panels of each drag reduction system shown in FIGS. 1 and 2A.

Looking now to FIGS. 1, 2B, and 4, the top panel 32 of the rear drag reduction system 12 extends generally horizontally along an upper, rear edge 19 of the rear frame 13. In particular, the top panel 32 extends along and above the horizontal top edge of the rear swing door 14 of the trailer 10. The top panel 32 is generally rectangular in shape and includes a forward edge 70, a rearward edge 72, an outer edge 74, and an inner edge 76 as shown in FIG. 4. Illustratively, the outer edge 74 is longer than the inner edge 76, and the forward edge 70 is longer than the rearward edge 72. Further illustratively, the inner and outer edges 74, 76 are not parallel to each other while the forward and rearward edges 70, 72 are also not parallel to each other.

As shown in FIG. 4, the forward edge 70 generally extends horizontally and is parallel to the upper edge 19 of the rear frame 13. The rearward edge 72, angles forwardly from the outside edge 74 toward the inside edge 76. As such, the inside edge 76 is shorter in length than the outside edge 74. Illustratively, the outside edge 74 angles slightly inwardly from the forward edge 70 to the rearward edge 72. Similarly, the inside edge 76 also angles slightly inwardly from the forward edge 70 to the rearward edge 72. Illustratively, the rearward edge 72 is angled approximately 7 degrees from a plane parallel to the rear swing door 14; the outer edge 74 is angled approximately 5 degrees and the inside edge 76 is angled approximately 3 degrees from a plane perpendicular to the rear swing door 14 and parallel to the sidewall 11. As shown in FIG. 4, the rearward edge 72 of the top panel 32 is positioned farther rearwardly than the rearward edge 50 of the side panel 30 when the rear drag reduction device is in its fully-deployed position. Illustratively, the top panel 32 extends approximately 35 inches rearwardly while the side panel 30 extends approximately 23 inches rearwardly when measured horizontally from the top member of the rear frame 13 of the trailer 10. While the particular locations, lengths, and angles of the edges 70, 72, 74, 76 of the top panel 32 are shown and described herein, it should be understood that the edges 70, 72, 74, 76 may be oriented in any suitable manner and length to define the top panel 32.

As shown in FIGS. 1, 2A, and 2B, the top panel 32 includes an upper planar portion 80, a step 82, and a lower, or stepped-down, planar portion 84. The upper portion 80 defines a plane that is positioned above a plane defined by the lower portion 84 of the top panel 32. As shown in a plan view in FIG. 4, the step 82 extends somewhat diagonally at an angle across a width of the top portion 32 to define the upper generally triangular portion 80 and the lower generally quadrilateral portion 84. In particular, the step 82 angles outwardly from the forward edge 70 to the rearward edge 72, such that the upper portion 80 also defines an outer portion of the top panel 32 and the lower portion 84 also defines an inner portion of the top panel 32. Illustratively, the step 82 does not define a vertical plane, but is angled as shown in FIGS. 1 and 4. As shown best in FIG. 4, the forward edge 70 of the lower portion 84 defines a curved cut-out 69. The curved cut-out 69 provides clearance for the upper portions of the door locking mechanism 200.

An angle 86 between the step 82 and the forward edge 70 of the lower portions 84 of the top panel 32 is approximately 135 degrees. As shown in FIG. 2B, the stepped-down portion 84 of the top panel 30 is positioned above the top edge of the rear swing door 14 and below the upper, center identification lights 88 of the trailer 10. As such, a driver traveling behind the trailer 10 of the present disclosure is able to see the identification lights 88 of the trailer 10 and the light emanated therefrom. Illustratively, the particular dimensions of the top panel 32 provide that a driver traveling behind the trailer 10 is able to see the identification lights 88 from a line of site approximately 10 degrees angled downwardly from the center, identification lights 88 and 45 degrees to the left and right of the lights 88. While such a driver may be unable to see the center, top identification lights 88 at close distances between the driver and the rear end of the trailer 10, the driver may then able to see the corner clearance lights 87 (shown in FIG. 5B) located at the upper corners of the rear frame 13 of the trailer 10 when the rear drag reduction system 12 is in the fully-deployed position. These upper corner lights 87 are positioned below the forward edge 72 of the upper portion 80 when the top panel 32 is in the fully-deployed position. As such, the two lower portions 84 of the adjacent top panels 32 create a viewable center ID light zone 85 defined by the angled steps 82 and the forward and rearward edges 70, 72 of the step-down portions 84 while also providing a top panel 82 having outer portions 80 with a forward edge 70 generally aligned with a top, rear edge 19 of the trailer 20 to maximize the aerodynamic effects of the top panel 32 on the trailer 10.

As shown best in FIGS. 1 and 3A, the entire top panel 32, including the upper portion 80, the step 82, and the lower portion 84, is angled downwardly from the forward edge 70 of the panel 32 to the rearward edge 72 of the panel 32. The forward edge 70 of the panel 32 is approximately located at the same height as the rear edge 19 top of the rear frame 13 of the trailer 10 while the rearward edge 72 of the top panel 32 is positioned at a location generally below the top edge 19 of the rear frame 13 of the trailer 10. Illustratively, the top panel 32 is angled downwardly approximately 12 degrees to define an acute angle 89 (shown in FIG. 3A) between the top panel 32 and the rear frame 13 of the trailer 10. As discussed above, the top edge 54 of the side panel 30 is angled substantially the same 12 degrees to allow the top panel 32 to rest thereon. The upper portion 80 of the top panel 32 illustratively rests on the top edge 54 of the side panel as shown in FIG. 4. Illustratively, both the upper portion 80 and the lower portion 84 of the top panel 32 are angled downwardly approximately the same 12 degrees. As such, the upper portion 80 and the lower portion 84 are generally parallel to each other. It should be understood, however, that the top panel 32 as well as the top edge 54 of the side panel, may define any suitable angle relative to the rear frame 13 of the trailer 10. Further, the upper and lower panels 80, 84 may be angled relative to (and not parallel to) each other to define different angles relative to the vertical plane of the trailer 10.

Figure 5A:
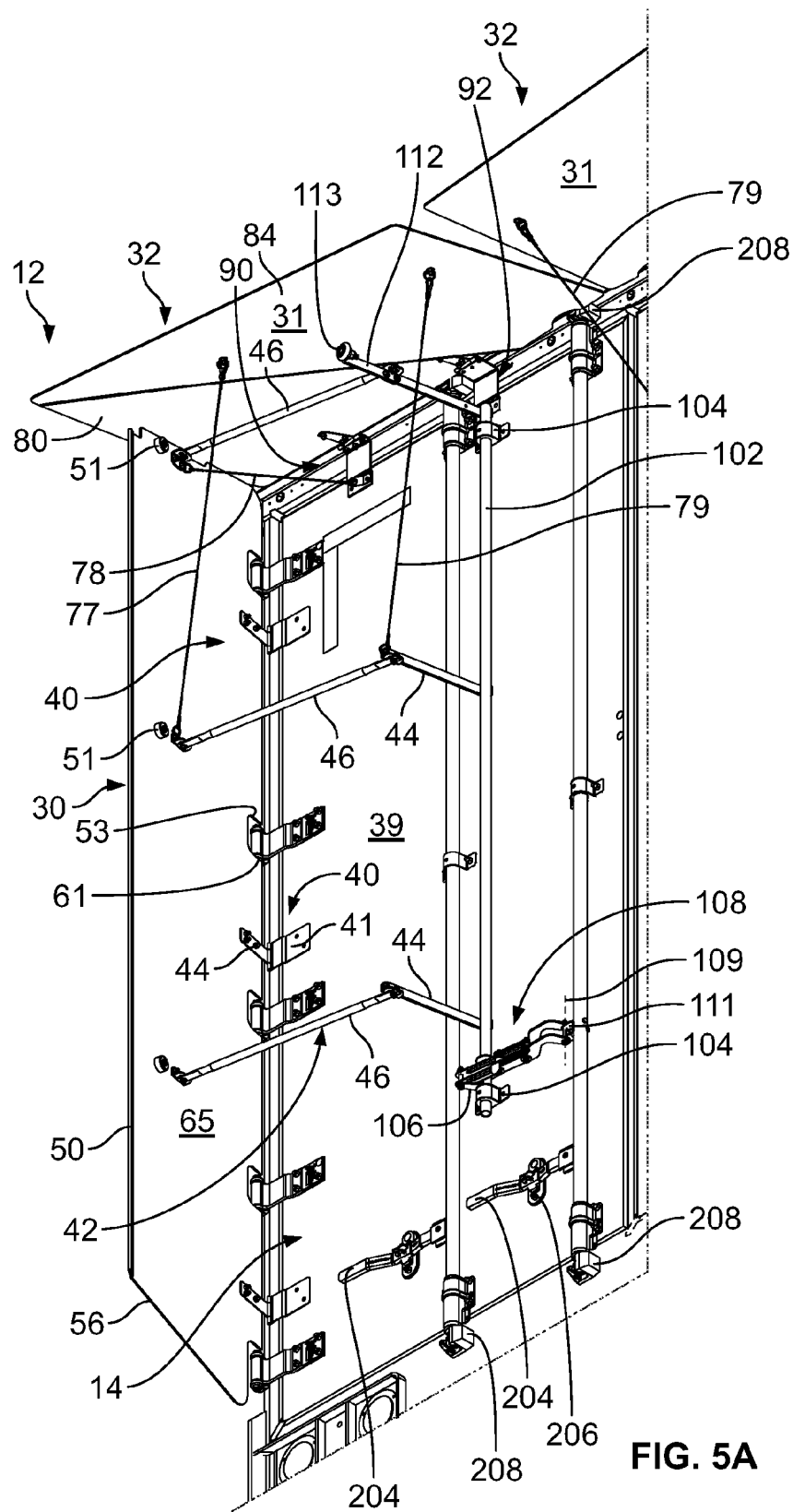
Figure 5B:
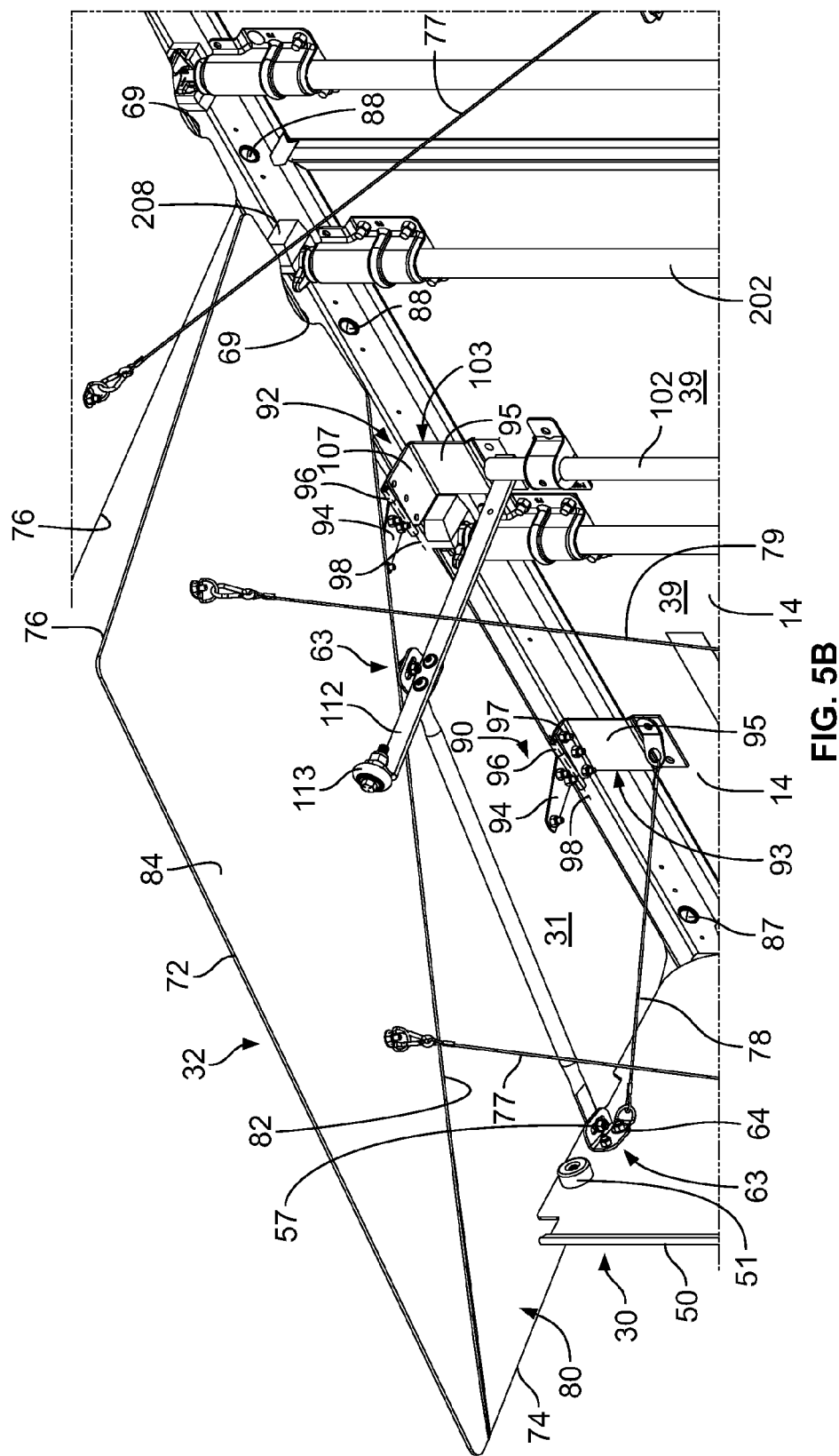
FIG. 5B is an enlarged, perspective view of the top panel and a portion of the side panel in the fully-deployed position, and showing the top panel supported on a top edge of the side panel as well as on a support arm including a roller at a distal end thereof.

As shown in FIGS. 5A and 5B, the top panel 32 is pivotably coupled to the rear swing door 14 for movement relative to the rear swing door 14 between fully-deployed and fully-stowed positions. First and second hinges 90, 92 of the rear drag reduction system 12 are coupled to the top panel 32 and the rear swing door 14 to allow the top panel 32 to pivot relative to the rear swing door 14. As shown in FIG. 5B, the first, outer hinge 90 includes an L-shaped hinge plate 93 having a vertically-extending portion 95 that is coupled to the outer surface 39 of the rear swing door 14 adjacent a top edge thereof, and a rearwardly-extending portion 97 coupled to a top end of the vertical portion 95 and extending generally perpendicularly to the portion 95. The hinge 90 further includes a hinge joint 96 coupled to the distal end of the rearwardly-extending portion 97 of the L-shaped hinge plate 93, and a hinge plate 94 coupled to both the hinge joint 96 and the bottom surface 31 of the upper portion 80 of the top panel 32. As shown in FIGS. 4 and 5B, the hinge joint 96 defines a pivot axis 98 therethrough. As is discussed below, the pivot axis 98 is not parallel to the upper rear edge 19 of the rear frame 13, but is offset (or angled) relatively thereto in order to allow for more compact folding of the rear drag reduction system 12 when in the fully-stowed position.

In particular, when the rear swing door 14 of the trailer 10 is in its fully-opened position adjacent the sidewall 11 of the trailer 10, the rear swing door 14 is not parallel to the sidewall 11 of the trailer 10. Rather, a generally "pie-shaped" space (when viewed from above) is created between the door 14 and the sidewall 11. It is in this pie-shaped space that the rear drag reduction system 12 is located when in its fully-stowed position. However, because the top panel 32 must fold over the side panel 30 and the lock-rods 202 of the door locking mechanism 200, the offset, or angled, hinge axis 98 operates to accommodate this structure to allow the rear drag reduction system 12 to be positioned within the pie-shaped space between the sidewall 11 of the trailer 10 and the rear swing door 14 in the fully-stowed position.

Similar to the first, outer hinge 90, the second, inner hinge 92 includes the hinge plate 94 coupled to the bottom surface 31 of the upper portion 80 of the top panel 32, the hinge joint 96, and an L-shaped hinge plate 103 including the vertical portion 95 and a larger rearwardly-extending (or horizontal) portion 107. Because the hinge joint 96 of each hinge 90, 92 is coupled to a rearward end of the respective horizontal portions 97, 107 of each L-shaped hinge plate 93, 103, and because the horizontal portion 107 of the second hinge 92 is larger (and extends farther rearwardly) than the horizontal portion 97 of the first hinge 90, the hinge joint 96 of the second hinge 92 is positioned farther rearwardly from the rear frame 13 of the trailer 10 than the hinge joint 96 of the first hinge 90. Similar to the first hinge 90, the second hinge 92 is positioned at a slight angle so that the hinge joints 96 of the first and second hinges 90, 92 are aligned to define the angled hinge axis 98. As shown best in FIG. 4, the hinge axis 98 defined by the first and second hinges 90, 92 is angled outwardly approximately 5 degrees from the rear frame 13 of the trailer 10 as measured from the outer edge 74 of the top panel 32 to the inner edge 76 of the top panel 32.

It should also be noted that the vertical portion 90 of each L-shaped hinge plate of the hinges 90, 92 extends upwardly above the top edge of the swing door 14 in order to generally align the forward edge 70 of the upper portion 80 of the top panel 32 with the top rear edge 19 of the rear frame 13 of the trailer 10. As such, both the forward edge 70 of the upper and lower portions 80, 84 of the top panel 32 is positioned above the rear swing door 14 when the top panel 32 is in the fully-deployed position. Further, the forward edge 70 of the top panel 32 is positioned above the rear swing door 14 when the top panel 32 is in the fully-stowed position.

Figure 8:
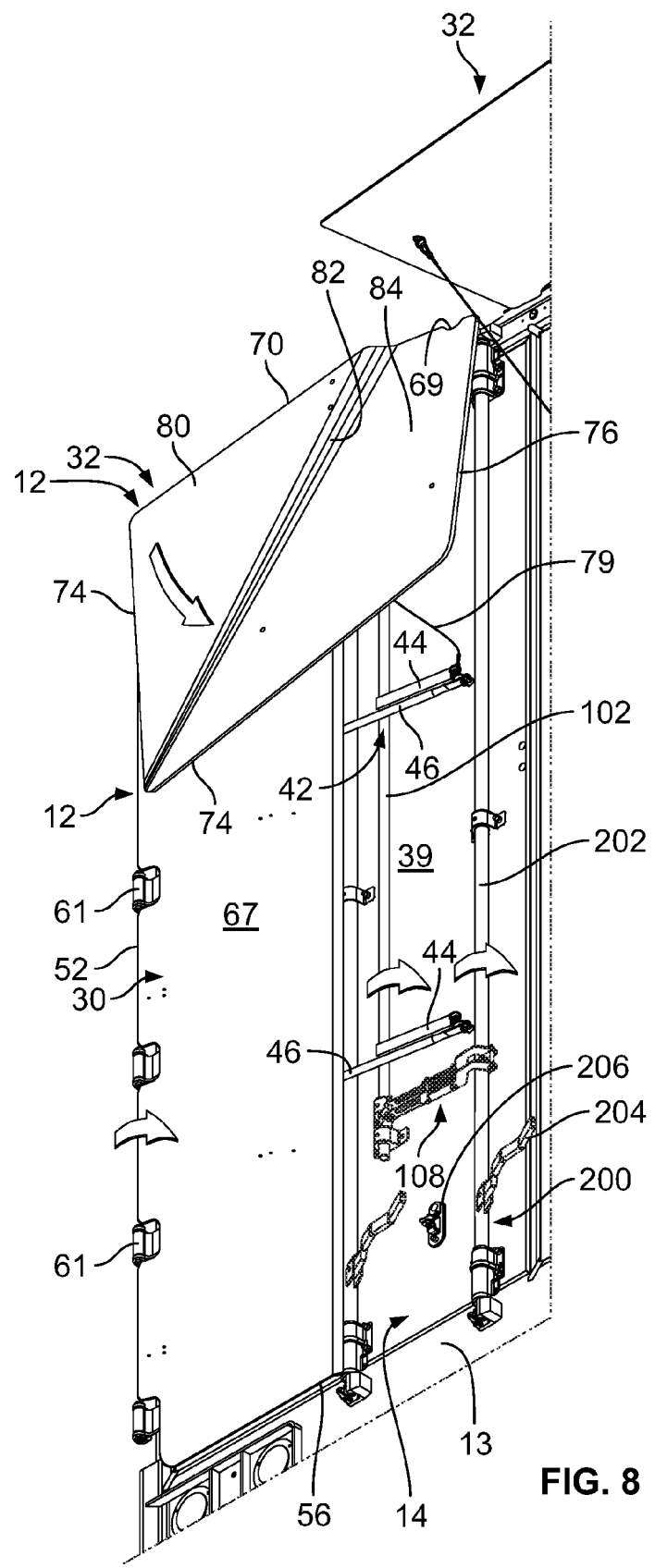
Figure 9:
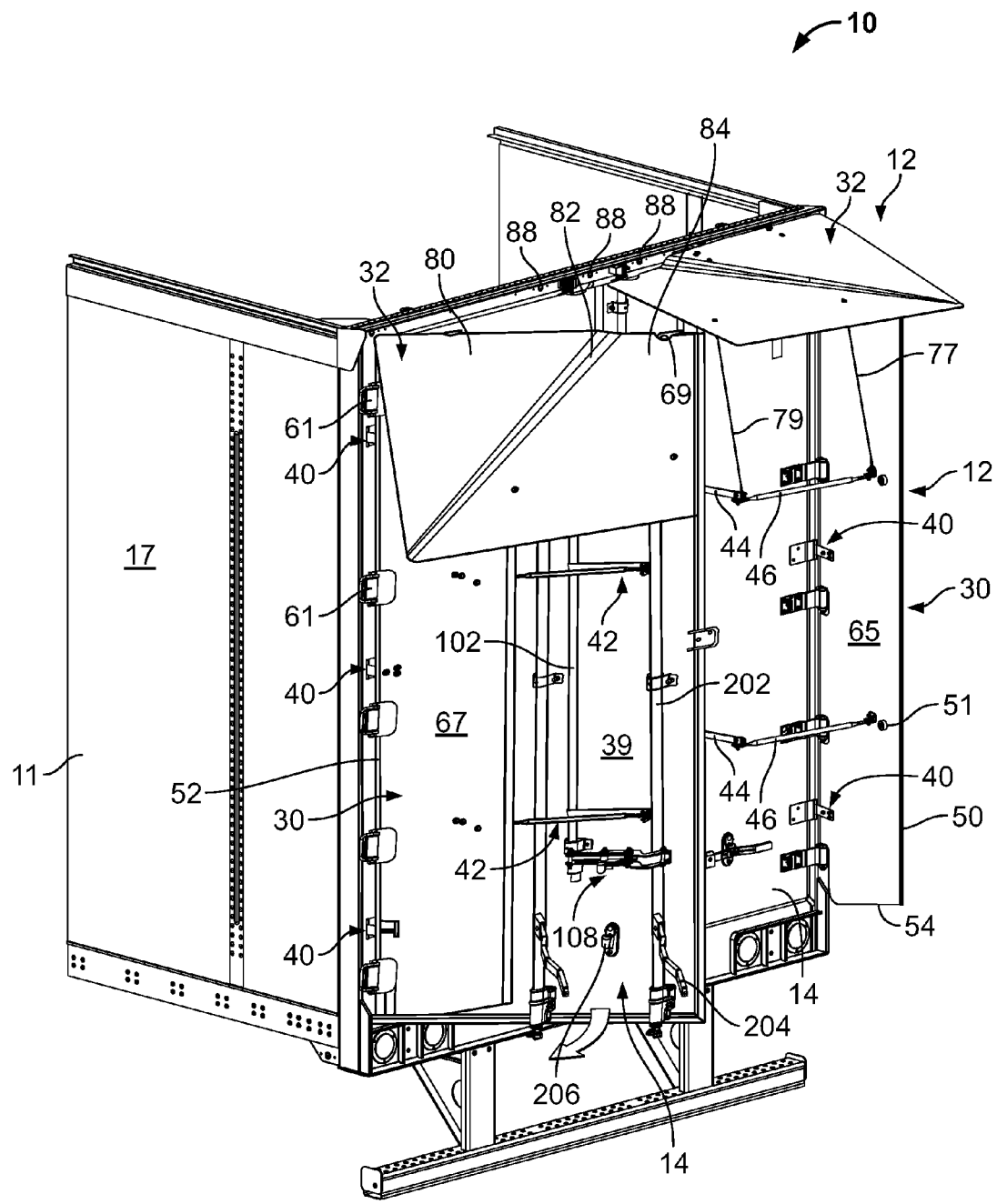
FIGS. 9-13 are rear and side perspective views of the drag reduction system of FIGS. 1-8 showing the top and side panels in their fully-stowed positions against the rear swing door, and showing movement of the rear swing door toward its fully-opened position adjacent the sidewall of the trailer.
Figure 10:
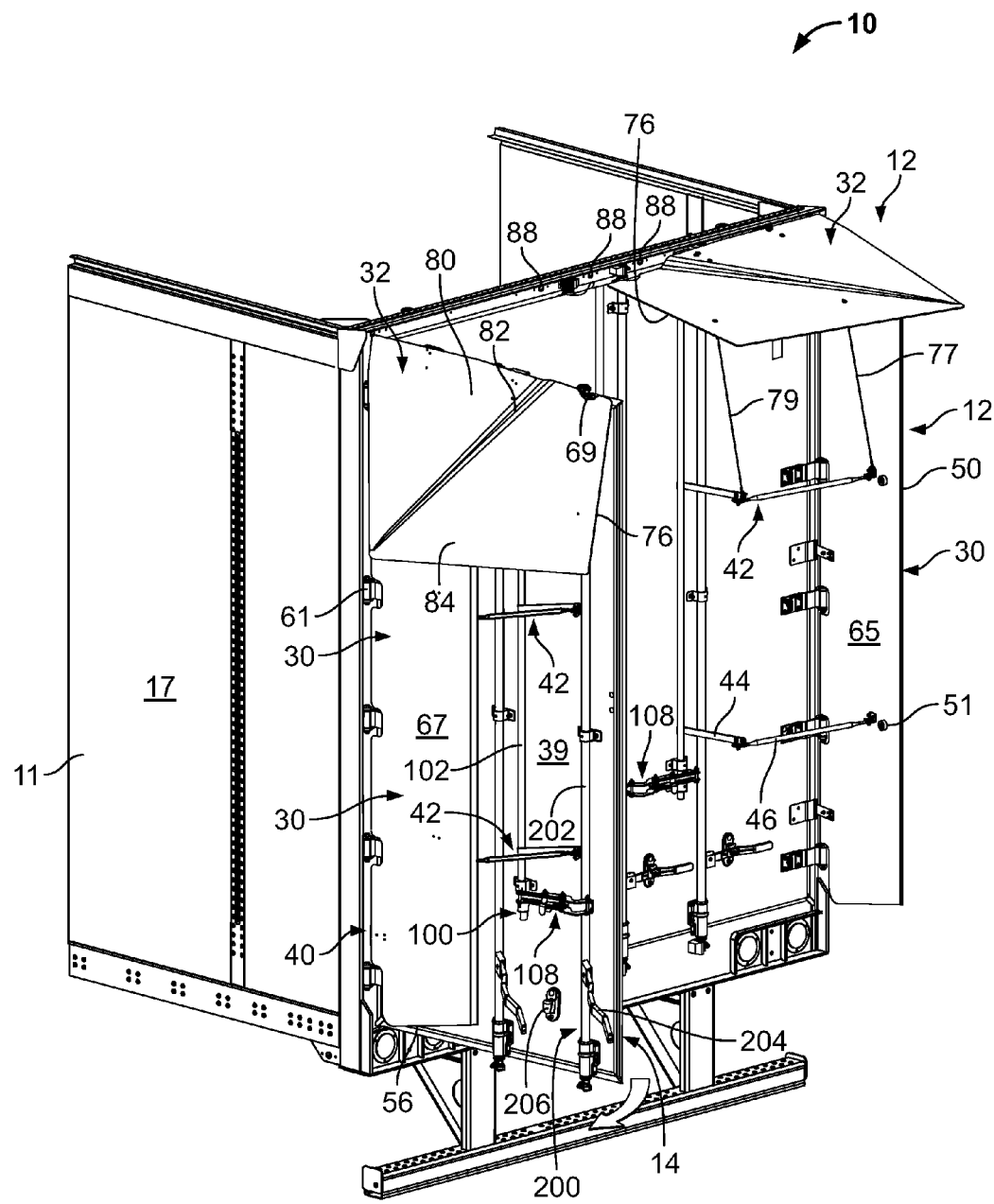
Figure 11:
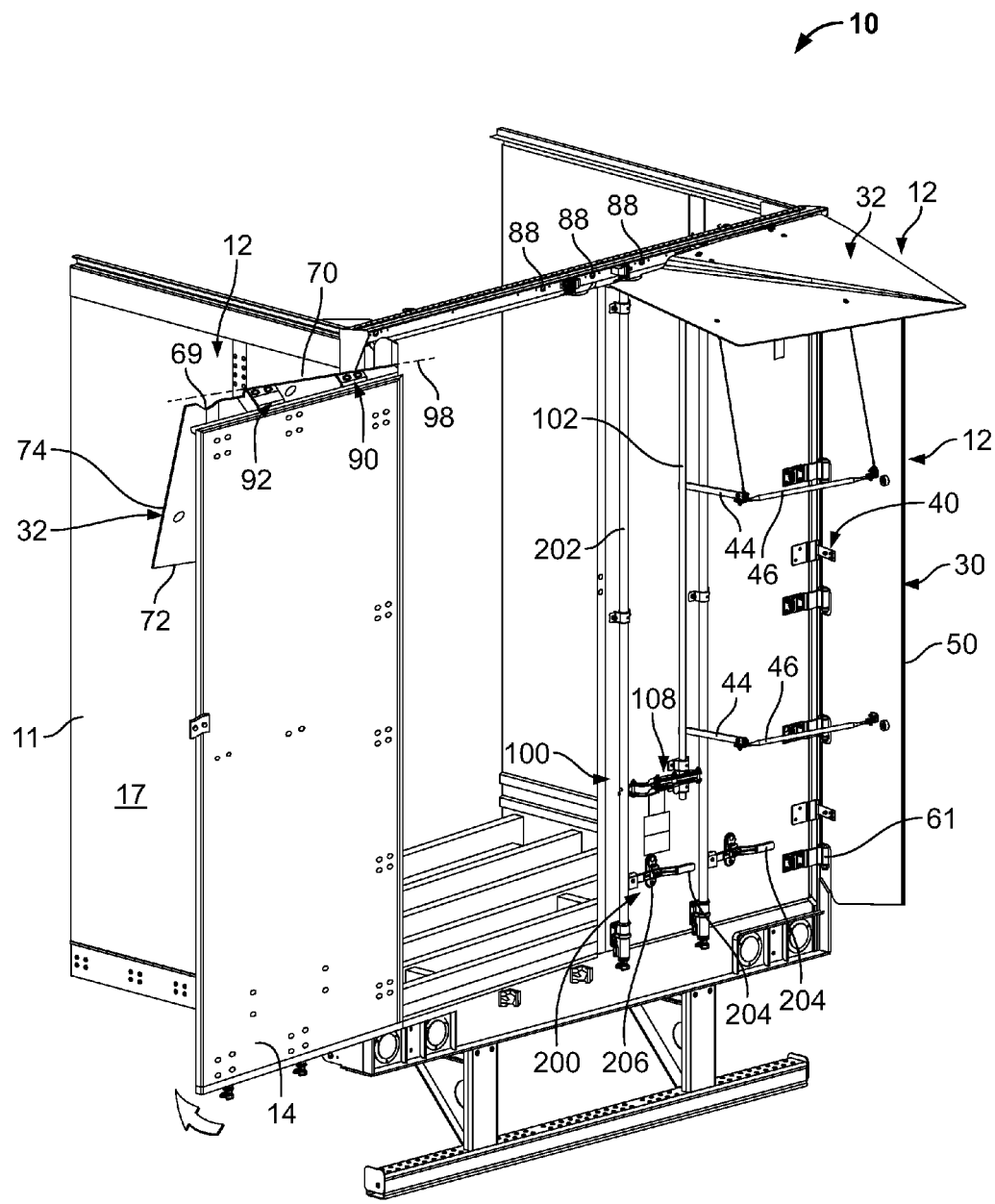
Figure 12:
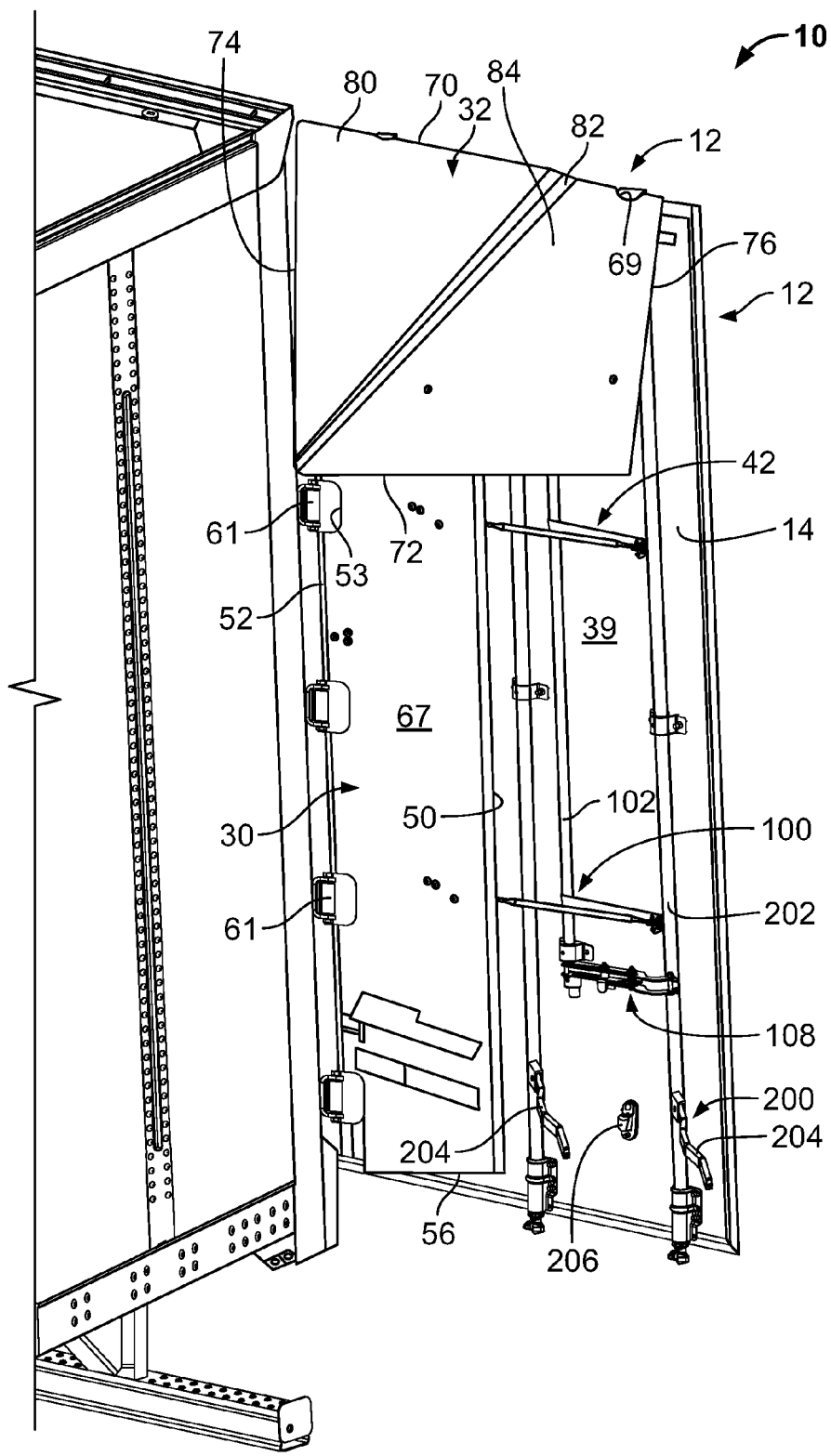

In order to move side panel 30 and the top panel 32 between the fully-deployed and fully-stowed positions, the rear drag reduction system 12 includes a folding mechanism 100 coupled to the side panel 30, the top panel 32, and the rear swing door 14. The folding mechanism 100 operates to move the side and top panels 30, 32 from the deployed position extending away from the trailer 10 (as shown in FIGS. 5A and 5B) to a collapsed, or folded and stowed, position generally adjacent to the rear surface 39 of the rear swing door 14 (as shown in FIG. 8). The folding mechanism 100 is coupled to a door locking mechanism 200 of the trailer 10 to move therewith. As is discussed in greater detail below, the folding mechanism 100 operates to automatically move the side and top panels 30, 32 to the fully-stowed position when a user moves the door locking mechanism 200 to an unlocked position in preparation for opening the rear swing door 14, for example.

Looking again to FIG. 5A, the folding mechanism 100 includes a vertically-extending deployment rod 102 coupled to the rear swing door 14 of the trailer 10 via brackets 104, and a first lever arm or bracket 106 (shown best in FIGS. 16-18) coupled at one end to the deployment rod 102 for rotational movement with the deployment rod 102 about a vertical axis defined by the deployment rod 102. A horizontally-extending linkage assembly 108 is pivotably coupled at a first end to the distal end of the lever arm 106 for rotation about a vertical pivot axis 107, and is pivotably coupled at a second end to a vertical lock-rod 202 of the door locking mechanism 200 via a bracket 111 defining a vertical pivot axis 109 at a distal end thereof.

The folding mechanism 100 further includes a support arm 112 coupled to a top end of the deployment rod 102 for rotational movement therewith. The support arm 112 extends rearwardly away from the rear frame 13 of the trailer 10 when the rear drag reduction system 12 is in the fully-deployed position. A roller 113 of the support arm 112 is coupled to a distal end of the arm 112 to engage the bottom surface 31 of the lower portion 84 of the top panel 32. As such, the roller 113 of the support arm 112 is engaged with and supports the bottom surface 31 of the bottom portion 84 of the top panel 32 when the system 12 is in the fully-deployed position. Illustratively, the roller 13 engages the bottom surface 31 of the lower portion 84 of the top panel 32. As noted above, the bottom surface 31 of the upper portion 80 of the top panel 32 is engaged with and supported on the top edge 54 of the side panel 30, as shown in FIG. 5A, when the rear drag reduction device is in the fully-deployed position. As is discussed in greater detail below, rotation of the deployment rod 102 during operation of the folding mechanism 100 causes the support arm 112 and side panel 30 to rotate therewith to a position where the top panel 32 is not supported on either the side panel 30 or the support arm 112 and is caused to pivot downwardly about the axis 98 of the hinges 90, 92 to its stowed position. While the illustrative support arm 112 and roller 113 are shown and described herein, it should be understood that any similar arm, fin, or other structure may be coupled to the deployment rod 102 to rotate with the deployment rod 102 and aide in supporting the top panel 32 thereon when the top panel 32 is in the fully-deployed position.

Figure 14:
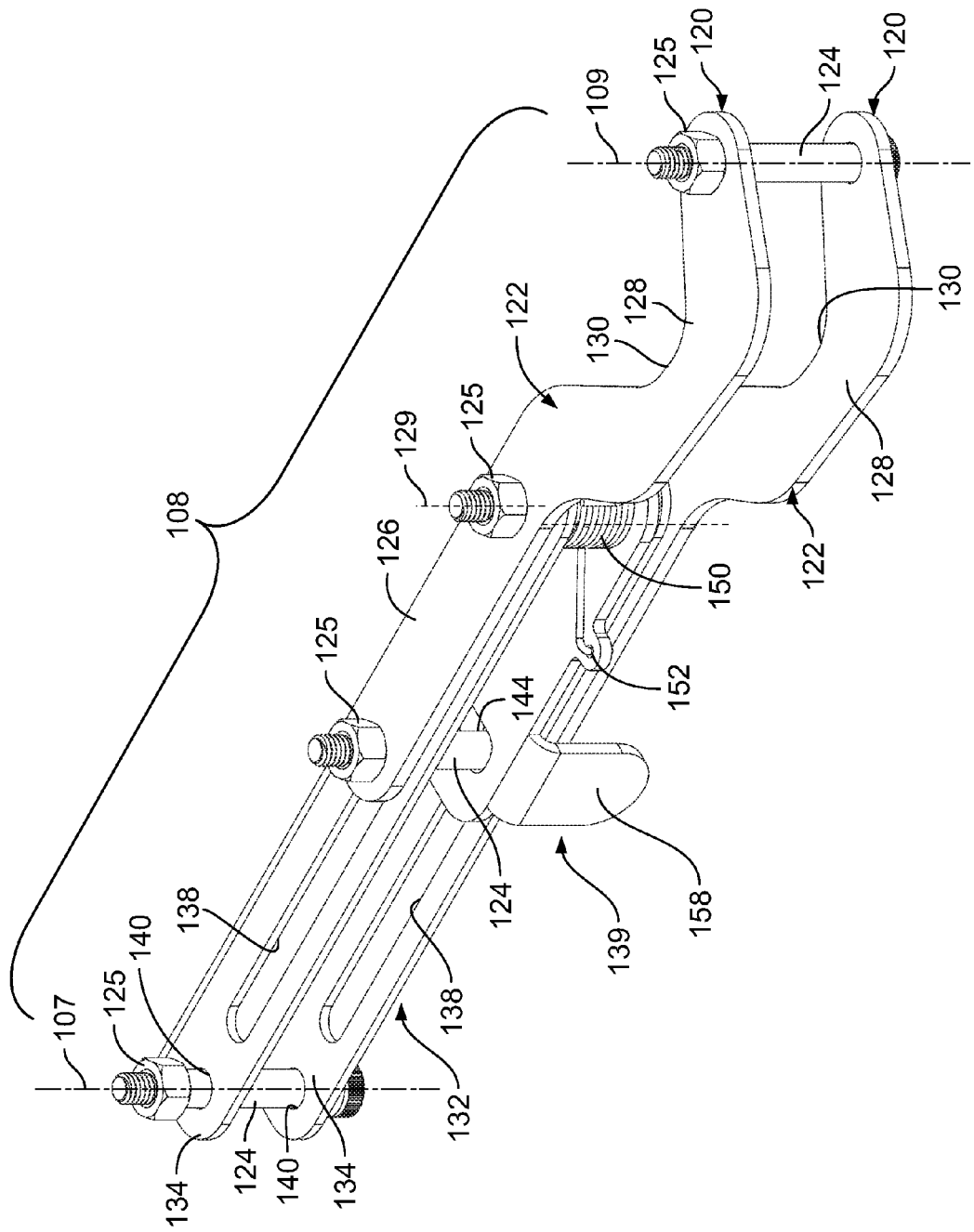
FIG. 14 is a perspective view of the horizontal, linkage assembly coupling the deployment rod to the lock-rod and showing a manual release mechanism of the linkage assembly.
Figure 15:
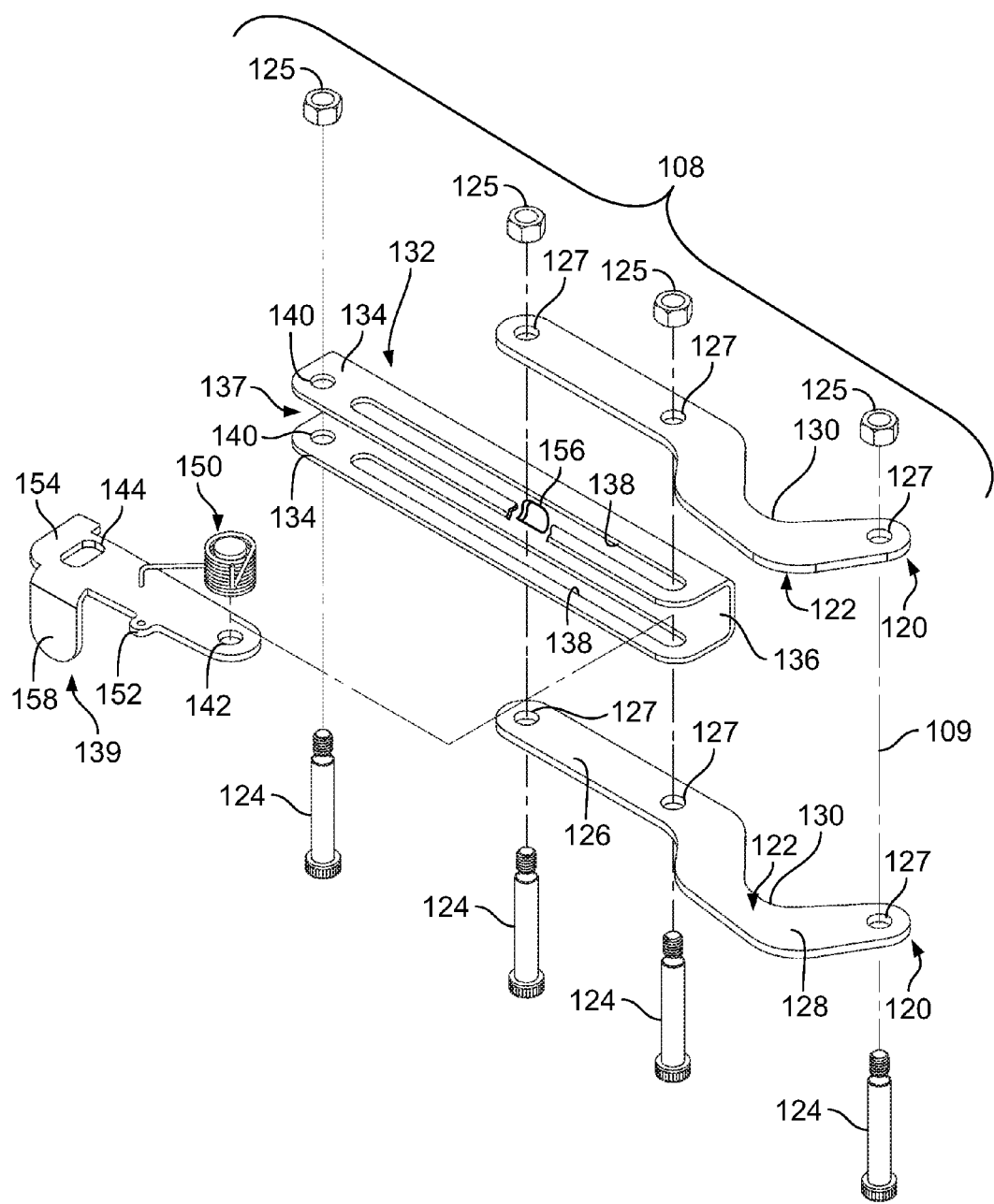
FIG. 15 is an exploded, perspective view of the horizontal linkage assembly of FIG. 14.

Looking now to FIGS. 14 and 15, the horizontally-extending linkage assembly 108 includes a first link 120 including two identical plates 122 spaced-apart from each other via three threaded pins 124 and accompanying nuts 125. The pins 124 are received through aligned apertures 127 of the plates 122. Each plate 122 includes a linear portion 126 and a curved, or hooked, portion 128 defining a curve 130. The pin 124 received through and coupled to the end of the curved portion 128 of each plate 122 is also coupled to the mounting bracket 111 rigidly attached to the lock-rod 202 of the door locking mechanism 200. This pin 124 operates to define the vertical pivot axis 109.

The linkage assembly 108 further includes a second link 132 coupled to and positioned between the upper and lower plates 122 of the first link 120. The second link 132 is generally U-shaped in cross-section and includes generally identical upper and lower plates 134 and a back plate 136 coupled to and positioned between each of the upper and lower plates 134 to define a channel 137 therein. Each of the upper and lower plates 134 of the second link 132 includes an elongated slot 138 and an aperture 140. Two of the pins 124 located through the linear portions 126 of the plates 122 of the first link 120 are received through the aligned, elongated slots 138 of the upper and lower plates 134 of the second link 132 in order to allow the second link 132 to slide laterally back and forth relative to the first link 120 along an axis defined by the slots 138 that is generally perpendicular to the vertical pivot axis 109. A fourth pin 124 is received through the apertures 140 of the second link 132 in order to couple the second link 132 to the lever arm 106 of the folding mechanism 100. As noted above, the lever arm 106 is rigidly coupled to the deployment rod 102 for rotational movement therewith. The fourth pin 124 pivotably coupling the lever arm 106 with the second link 132 defines the vertical pivot axis 107.

A manual release mechanism 139 is coupled to both the first link 120, the second link 132, and the two pins 124 received through the linear portion 126 of the plates 122 of the first link 120. The manual release mechanism 139 is positioned within the channel 137 of the second link 132. As is discussed in greater detail below, the manual release mechanism 139 allows a user to functionally disengage the folding mechanism 100 from the door locking mechanism 200 of the trailer 10 to allow the user to manually fold the top and side panels 30 and 32 to their fully-stowed positions without unlocking the door locking mechanism 200. The manual release mechanism 139 includes a manual release lever 141 and a coil spring 150. An aperture 142 at one end of the manual release lever 141 receives one pin 124 therethrough while a slot 144 at the other end of the manual release lever 141 receives the other pin 124 therethrough. The slot 144 defines an axis perpendicular to the elongated slots 138 of the second link 132. The coil spring 150 is coupled at one end to the second link 132 and at the other end to a spring mount aperture 152 of the manual release lever 141.

The manual release lever 141 further includes a detent 154 normally received through a slot 156 formed in the back wall 136 of the second link 132. The coil spring 150 operates to bias the detent 154 to a locked position within the slot 156. The manual release lever 141 further includes a pull-tab 158 configured to be grasped by a user in order to pull the detent 154 rearwardly against the bias of the spring 150 out of the slot 156 to an unlocked position allowing the second link 132 to move relative to the first link 120. The coil spring 150 is aligned with the aperture 142 of the manual release lever 141 such that the corresponding pin 124 is received therethrough. This pin 124 defines a pivot axis 129 about which the manual release mechanism 139 pivots.

While the illustrative spring 150 is a coil spring, it should be understood that any biasing mechanism may be used in order to normally bias the manual release lever 141 to a locked position with the detent 154 received within the slot 156. As is discussed in greater detail below, the first and second links 120, 132 are normally in a locked position and do not move, or slide, laterally relative to each other. Rather, the links 120, 132 operate as a single unit during operation of the folding mechanism 100 to allow a user to manipulate the handle 204 of the door locking assembly 200 in order to automatically move the side and top panels 30, 32 between fully-deployed and fully-stowed positions. However, the manual release mechanism 139 is provided to allow a user to move the first and second links 120, 132 laterally relative to each other to rotate the deployment rod 102 and the lock-rod 202 relative to each other to move the side and top panels 30, 32 from the fully-deployed position to the fully-folded position while maintaining the rear swing door 14 in a locked position.

Looking now to FIGS. 2A, 3B, and 5A, the folding mechanism 100 further includes three illustrative linkage assemblies 37, 42 coupled to the deployment rod 102 for movement therewith and coupled to the inside surface 65 of the side panel 30. As is discussed in greater detail below, the linkage assemblies 37, 42 operate to move the side panel 30 from its fully-deployed position to its fully-stowed position via operation of the folding mechanism 100 coupled to the door locking assembly 200. Illustratively, as shown in FIG. 5A, the folding mechanism 100 includes the top linkage assembly 37 (which, as is discussed below, includes the support arm 112), a middle linkage assembly 42, and a bottom linkage assembly 42. Each of the two middle and bottom linkage assemblies 42 includes a first link 44 rigidly coupled to the deployment rod 102 for rotational movement with the deployment rod 102 about a vertical axis defined by the deployment rod 102. As shown in FIG. 5A, the first links 44 extend generally rearwardly away from the rear door 14 of the trailer 10 when the rear drag reduction mechanism 12 is in the fully-deployed position.

Each linkage assembly 42 further includes a second link 46 pivotably coupled at a first end 47 to a distal end 49 of the first link 44 and pivotably coupled at a second end 73 pivotably coupled to the second panel 30 for pivotably movement relative to both the first link 44 and the second panel 30. In particular, each linkage assembly 42 includes a first L-shaped bracket 63 coupled to the distal end 49 of the first link 44 and including a slot 57 formed therethrough defining a longitudinal axis generally parallel to the first link 44. A pivot pin 58 defining a pivot axis 60 is received through the slot 57 of the mounting bracket 63 and an aperture 62 formed in the first end 47 of the second link 46. As such, the second link 46 is pivotable about the axis 60 relative to the first link 44 and is also movable along the longitudinal axis of the slot 63 relative to the first link 44. Another mounting bracket 63 is coupled to the inner surface 65 of the side panel 30, and a fastener 64 defining a pivot axis 66 is received through the slot 57 of the mounting bracket 63 (which extends generally perpendicular to the vertical, longitudinal axis of the side panel 30) and an aperture (not shown) through the second end 73 of the second link 46. As such, the second link 46 is pivotable about the axis 66 relative to the side panel 30 and is also movable along the longitudinal axis of the slot 57 relative to the side panel 30.

It should be understood that the slots 57 within the mounting brackets 63 to allow for longitudinal movement of each end 47, 73 of the second link 46 relative to the side panel 30 and the first link 44. Such longitudinal movement may help accommodate manufacturing tolerances in order to allow for the components of the linkage assembly 42 to be more easily installed and/or to allow for the components to better move relative to each other from the fully-deployed position to the fully-stowed position in order to fold close against the rear door 14 of the trailer 10, for example. It should be understood that either a slot or aperture may be provided at within the mounting brackets 63. Further, it should be understood that the second link 46 itself may be provided with a slot, rather than an aperture, at each of the first and second ends thereof. Further, while the slots 57 are shown and disclosed herein, it should be understood that a resilient grommet may also be used in order to accommodate such aforementioned manufacturing tolerances.

Looking now to FIG. 3B, the top linkage assembly 37 is similar to the middle and bottom linkage assemblies 42 described above. As such, like reference numerals are used to denote like components. In particular, the top linkage assembly 37 includes the second link 46, a mounting bracket 63 coupled to the inner surface 65 of the side panel 30 and to the second end 55 of the second link 46, and another mounting bracket 63 coupled to the first end 47 of the second link 46. The linkage assembly 37 further includes the support arm 112 described above. In general, the support arm 112 operates in the same manner as the first link 44 to connect the second link 46 to the deployment rod 102. As shown in FIG. 3B, the mounting bracket 63 is coupled to the support arm 112 at a location between the roller 113 and the proximal end of the support arm 112 coupled to the deployment rod 102 for rotational movement therewith.

As is described in greater detail below, the linkage assemblies 37, 42 couple the folding mechanism 100 of the rear drag reduction device 12 to the side panel 30 in order to move the side panel 30 between its fully-deployed and fully-stowed positions. As noted above, the top panel 32, which is supported on the roller 113 of the support arm 112 and on the top edge 54 of the side panel 30, is also moved between the fully-deployed and fully-stowed positions by movement of the folding mechanism 100. That is, as the side panel 30 and support arm 112 are caused to rotate with the deployment rod 102 toward their stowed positions, the top panel 32 is no longer supported thereon and is, therefore, urged to pivot downwardly about the axis 98.

A bumper 51, as shown in FIG. 3B, is coupled to an inner surface 65 of the side panel 30 near the mounting brackets 63. The illustrative bumper 51 is made of rubber, but may be made of any suitable resilient, compressible, or pliable material. The rubber bumper 51 is generally cylindrical in shape and is provided to engage the second link 46 when the rear drag reduction system 12 is in its fully-stowed position. The rubber bumper 51 provides some cushion or dampening, as well as positioning of the components, when the side panel 30 is in the fully-stowed position. For example, the rubber bumper 51 may aide in setting the position and spacing of the side panel 30 relative to the link 46 when the side panel 30 is in the fully-stowed position. In particular, when the side panel 30 is in the fully-stowed position, the bumper 51 maintains a minimum angle between the link 46 and the side panel 30 and prevents the link and panel 46, 30 from folding any further beyond the minimum angle. The minimum angle ensures that once force is applied to the side panel 30 (via the linkage assemblies 37, 42) to deploy the side panel 30 from its fully-stowed position to its fully-deployed position, the side panel 30 deploys out away from the rear swing door 14 rather than going over the center of the link 46 toward the rear door 14. Further, the resilient nature of the bumper 51 allows the bumper to compress slightly to store energy which is returned to the link 46 during the first few degrees of actuation allowing the side panel 30 to deploy with less effort.

Looking now to FIGS. 2A, 2B, 3B, and 5A, the rear drag reduction system 12 further includes a first cable 77 coupled at a first end to the bottom surface 31 of the lower portion 84 of the top panel 32, and coupled at a second end to the bracket 63 of the middle linkage mechanism 42 that is coupled to the inner surface 65 of the side panel 30. In particular, a clip on the end of the cable 77 is coupled to a bracket on the bottom surface 31 of the top panel 32, and a clip on the other end of the cable 77 is coupled to the L-shaped bracket 63. A second cable 79 extends between, and is coupled to, the bottom surface 31 of the lower portion 84 of the top panel 32 via a clip and bracket and is coupled to the other mounting bracket 63 of the middle linkage mechanism 42 coupled to the first link 44 via a clip. Illustratively, the cables 77, 79 operate to minimize or prevent any tendency for the top panel 32 to move upwardly when the rear drag reduction device 12 is in the fully-deployed position and the trailer 10 is traveling down the highway. In other words, the cables 77, 79 operate to stabilize the top panel 32 when in the fully-deployed position. However, the cables 77, 79 do not operate to support the top panel 32 in its fully-deployed position.

Another cable 78 of the rear drag reduction device 12 is provided. As shown in FIGS. 5A and 5B, the cable 78 is coupled at a first end to the mounting bracket 63 of the top linkage assembly 42 coupled to the inner surface 65 of the side panel 30. A clip at the second end of the cable 78 is coupled to the lower plate 95 of the hinge assembly 90. Illustratively, the cable 78 operates to prevent the side panel 30 from pivoting outwardly about the hinge axis 48 beyond its fully-deployed position when the side panel 30 is moved from its folded, or fully-stowed, position to its fully-deployed position. In other words, the cable 78 operates as a limit strap to prevent pivoting movement of the side panel 30 beyond its predetermined, angled location relative to the rear door 14 and the sidewall 11 of the trailer in its fully-deployed position.

In use, the rear drag reduction system 12 is automatically moved from its fully-deployed position to its fully-stowed position by the action of a user unlocking the door locking mechanism 200 of the rear swing door 14 of the trailer 10 as shown in FIGS. 5A-8. FIGS. 9-13 further illustrate the ability of the rear swing door 14 (with the rear drag reduction system 12 thereon) to be moved to its fully-opened position adjacent the sidewall 11 of the trailer 10 when the rear drag reduction system 12 is folded and in its fully-stowed position against outer surface 39 of the rear swing door 14. In particular, the side and top panels 30, 32 of the rear drag reduction system 12 are automatically moved from their fully-deployed positions to their fully-stowed positions by action of a user unlocking the door locking mechanism 200 of the trailer 10 (as shown in FIGS. 5A-8); the fully-stowed side panel 30 and the fully-stowed top panel 32 of the rear drag reduction system 12 are then automatically moved with the rear swing door 14 by action of a user opening the rear swing door 14 and pivoting the rear swing door 14 about its hinges 50 approximately 270 degrees to its fully-opened position adjacent the sidewall 11 of the trailer 10 (as shown in FIGS. 9-13). When the rear door 14 is in its fully-opened position, the rear drag reduction device 12 is positioned between the sidewall 11 and the rear surface 39 of the door 14.

Looking first to FIGS. 5A-8, the door locking mechanism 200 of the trailer 10 includes the lock-rod 202 extending generally the entire vertical length of the rear frame 13 and coupled to the rear swing door 14 for pivoting movement relative thereto. A handle assembly of the door locking mechanism 200 includes the handle 204 coupled to the lock-rod 202 and latch 206 is coupled to the rear door 14 to receive the handle 204 in a locked position. When the handle 204 is received within the latch 206, the lock-rod 202 is in a locked position where top and bottom ends of the lock-rod 202 are received within lock-rod keepers 208 coupled to the rear frame 13 of the trailer 10 to prevent the door 14 from being opened. When the handle 204 is received within the latch 206, the support arm 112 is in an extended position extending rearwardly to aide in supporting the top panel 32 of the rear drag reduction system 12 in the fully-deployed position (as shown in FIGS. 5A and 5B). The top panel 32 is also supported by the top edge 54 of the side panel 30. Further, when the handle 204 is received within the latch 206, first links 44 (along with the support arm 112 operating as the first links 44) are also in an extended, or deployed, position extending rearwardly to position the linkage assemblies 37, 42 (including the second links 46) in their deployed position to support the side panel 30 in its fully-deployed position.

Figure 6:
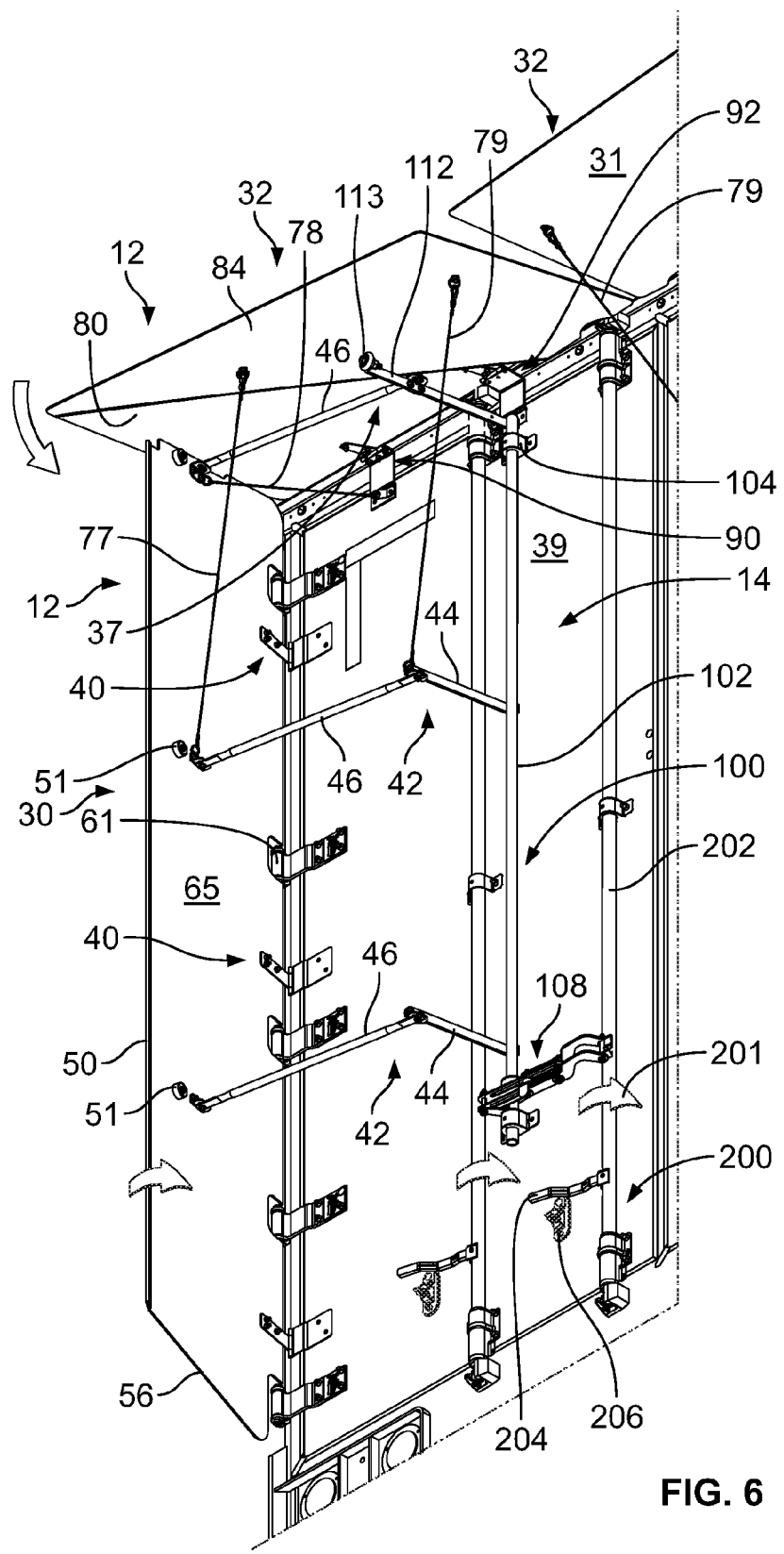

As the handle 204 of the door locking mechanism 200 of the trailer 10 is removed from the latch 206 and rotated approximately 180 degrees, as shown by the arrow 201 in FIG. 6, the lock-rod 202 of the door locking mechanism 200 is also rotated approximately 180 degrees in a counterclockwise direction about the vertical axis defined by the lock-rod 202 itself. As noted above, the deployment rod 102 is coupled to the lock-rod 202 via the lever arm 106 and the horizontal linkage mechanism 108 for rotational movement with the lock-rod 202. In other words, the deployment rod 102 is "slaved" to the lock-rod 202 such that as the lock-rod 202 is rotated via a user rotating the handle 204, the deployment rod 102 is similarly rotated about the vertical axis defined by the deployment rod 102 itself. When the user rotates the handle 204 approximately 180 degrees (as shown in FIGS. 5A-8), the lock-rod 202 rotates approximately 180 degrees in a counterclockwise direction while the deployment rod 102 is caused to rotate approximately 100 degrees in the same counterclockwise direction.

Figure 7:
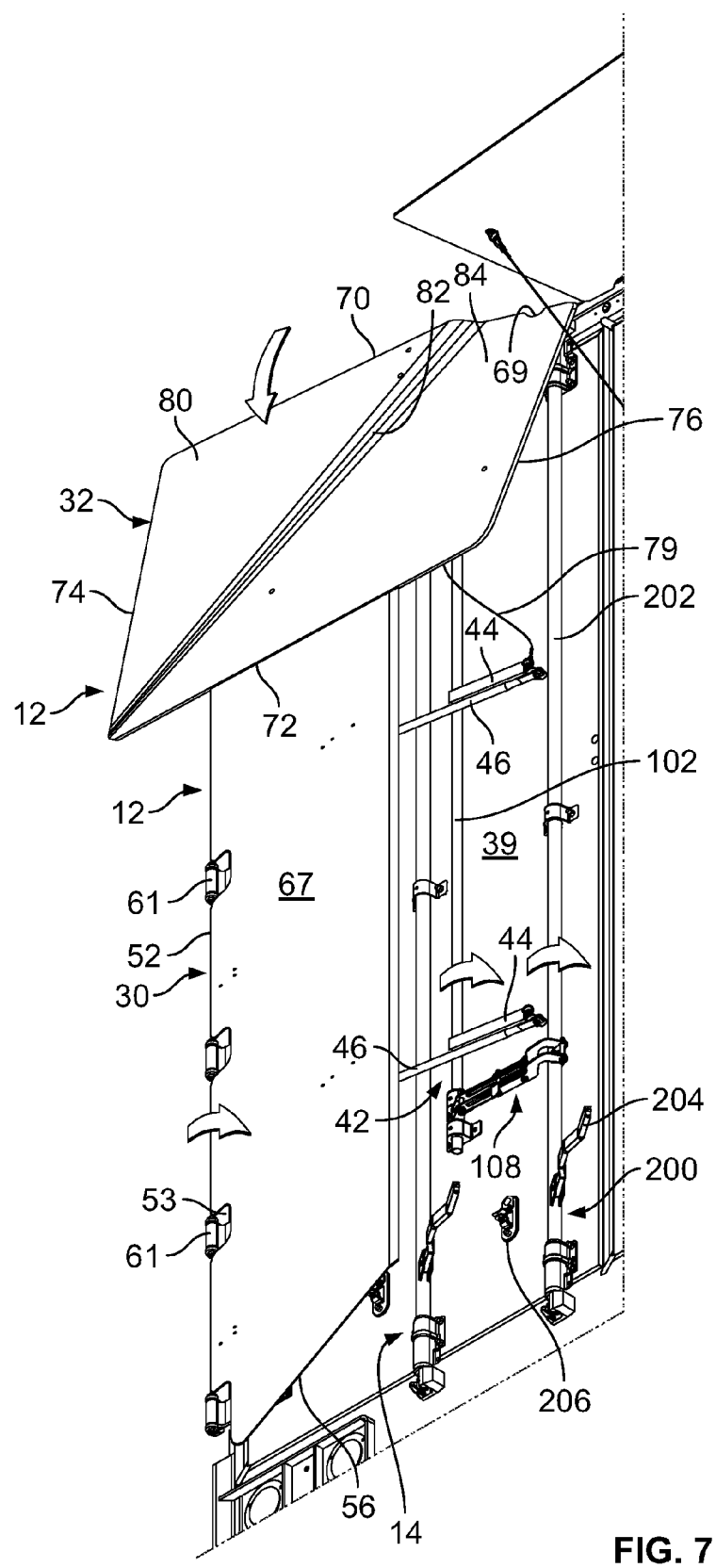

The support arm 112 and the first links 44 are each rigidly coupled to the deployment rod 102. As such, the support arm 112 and the first links 44 each rotate about the pivot axis defined by the deployment rod 102 when the deployment rod 102 is urged to rotate. As shown in FIGS. 5A-8, as the deployment rod 102 rotates approximately 100 degrees, the support arm 112 and first links 44 also rotate approximately 100 degrees between their deployed and stowed positions. Illustratively, therefore, the support arm 112 and the first links 44 each pivot approximately 100 degrees from their rearwardly-extending deployed positions to an out-of-the-way, or stowed, position wherein a distal, roller end 113 of the support arm 112 and the distal end 49 of the first links 44 are each generally adjacent the rear swing door 14 of the trailer 10. As shown in FIGS. 7 and 8, the second link 46 of the linkage assemblies 37, 42 is urged to pivot about both axes 60, 66 while urging the side panel 30 to pivot inwardly about the pivot axis 45. In moving to this out-of-the-way position, the first links 44 and support arm 112 pull the respective second links 42 therewith to urge the second panel 30 pivot in a counter-clockwise direction about the pivot axis 48 to lie generally adjacent to the rear surface 39 of the door 14.

In particular, the second panel 30 is moved via the linkage assemblies 37, 42 to pivot about the axis 45 to position the inner surface 65 of the side panel 30 generally adjacent the rear surface 39 of the door 14. Generally simultaneously, movement of the side panel 30 to its stowed position adjacent the rear swing door 14, and movement of the support arm 112 to its out-of-the-way position adjacent the rear swing door 14 allows the top panel 32 to pivot downwardly (via gravity) to its folded, fully-stowed position also generally adjacent to the rear swing door 14 of the trailer 10. The roller 113 rolls along the bottom surface 31 of the top panel 32 to its out-of-the-way, or stowed, position while the top edge 54 of the side panel 30 also moves along the bottom surface 31 of the top panel 32 to its folded position due to rotational movement of the deployment rod 102 and respective linkage assemblies 37, 42 of the folding mechanism 100 as described above. As noted above, the top panel 32 is pivotably coupled to the rear swing door 14 by hinges 90, 92 to allow the top panel 32 to pivot relative to the rear swing door 14 about a slightly angled axis 98. While the angled axis 98 is shown and described herein, it should be understood that the axis about which the top panel 32 pivots may be angled at any suitable degree, or may be horizontal such that the axis is generally parallel to the rear edge 19 of the trailer 10.

As noted above, the side panel 30 and the top panel 32 automatically move to their fully-stowed, folded positions when a user unlocks the door locking mechanism 200 of the trailer 10 by rotating the handle 204 of the door locking mechanism 200 approximately 180 degrees. Illustratively, as shown in FIGS. 5A-8, the side panel 30 folds to position the inner surface 65 of the side panel 30 adjacent the rear surface 39 of the rear swing door 14 of the trailer 10. During this time, the top panel 32 folds downwardly over the side panel 30 to position the side panel 30 between the top panel 32 and the rear swing door 14 of the trailer 10. Illustratively, the bottom surface 31 of the top panel 32 is adjacent to and generally engaged with an upper portion of the outer surface 67 of the side panel 30 when the rear drag reduction device 12 is in the fully-stowed position.

Looking now to FIGS. 9-13, once the side and top panels 30, 32 are moved to their fully-stowed positions, the top and side panels 32, 30 may move together with the rear swing door 14 to its fully-opened position adjacent the sidewall 11 of the trailer. In particular, as the rear swing door 14 is opened and moved to its fully-opened position generally adjacent the sidewall 11 of the trailer 10 (whereby the rear swing door 14 is pivoted approximately 270 degrees), the top and side panels 32, 30 remain in their fully-stowed positions adjacent the outer surface 39 of the rear swing door 14. In other words, when the rear swing door 14 is moved to its fully-opened position, the rear drag reduction system 12 does not generally move relative to the rear swing door 14 and remains in its fully-stowed position against the rear swing door 14.

Figure 13:
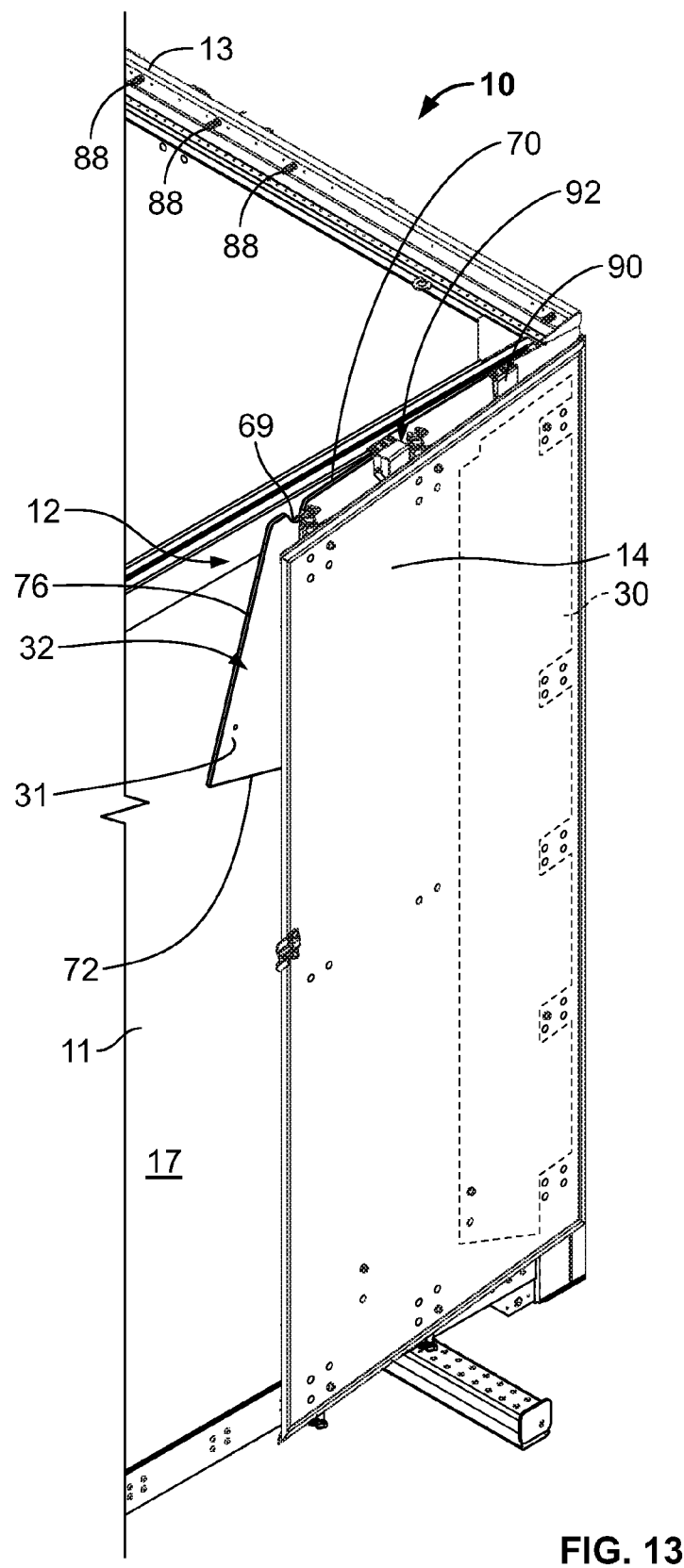

When the rear swing door 14 is in the fully-opened position, the top panel 32 of the rear drag reduction system 12 is positioned between the sidewall 11 of the trailer 10 and the side panel 30, and the side panel 30 is positioned between the top panel 32 and the rear swing door 14. Both the top and side panels 32, 30 of the rear drag reduction system 12 are located in an out-of-the-way position between the sidewall 11 and the rear swing door 14 of the trailer 10 as shown in FIG. 13.

To move the rear drag reduction system 12 from the fully-stowed position shown in FIGS. 8 (when the door 14 is in its closed position) and 9-13 (when the door 14 is moved to its fully-opened position) to the fully-deployed position shown in FIG. 1, the user simply moves the rear swing door 14 to its closed position and moves the handle 204 of the door locking mechanism 200 to the locked position within the latch 206. In other words, when the user moves the rear swing door 14 to its closed position and locks the handle 204 of the door locking mechanism 200, the rear drag reduction system 12 is automatically moved to its fully-deployed position. In particular, as the rear swing door 14 is moved to its fully-closed position, the rear drag reduction system 12 remains in its fully-stowed position adjacent the rear surface 39 of the door 14. Next, once the door 14 is fully-closed, as a user rotates the handle 204 of the door locking mechanism 200 to a locked position in order to lock the rear swing door 14 to the rear frame 13, the deployment rod 102 is rotated in a clockwise direction to move the support arm 112 and the first links 44 to their rearwardly-extended deployed positions. As the support arm 112 moves from its stowed, out-of-the-way position adjacent the rear swing door 14 to its deployed position, the roller 113 of the support arm 112 moves along the bottom surface 31 of the top panel 32 to aide in raising the top panel 32 from its folded, unsupported position to its extended position supported at least in part on the roller 113 of the support arm 112.

Further, as the first links 44 move from their stowed, out-of-the-way positions adjacent the rear swing door 14 to their rearwardly-extended deployed positions, the second links 46 are urged to pivot about the axes 60, 66 to urge the side panel 30 to pivot about the axis 45 to its fully-deployed position. As noted above, the cable 78 operates as a limit strap to prevent movement of the side panel 30 from the fully-stowed position to a position beyond the predetermined, angled fully-deployed position of the side panel 30. As the side panel 30 pivots about the axis 45 to its fully-deployed position, the top edge 54 moves outwardly along the bottom surface 31 of the top panel 32 to raise the top panel 32 from its folded, unsupported position to its extend position supported on the top edge 54 of the side panel 32 and on the roller 113 of the support arm 112.

As noted above, the rear drag reduction system 12 also includes a manual release mechanism 139 which allows a user to move the side and top panels 30, 32 from their fully-deployed positions to their fully-stowed positions without moving the door locking mechanism 200 itself to the unlocked position. For example, there may be occasions when a user wants to maintain the doors 14 of the trailer 10 in a locked position while also moving the rear drag reduction device 12 to the fully-stowed position in order to park the rear end of the trailer 10 in close proximity to another object, for example. As shown in FIGS. 14-18, the folding mechanism 100 may be functionally disengaged from (though still coupled to) the door locking mechanism 200 by moving the manual release lever 141 of the manual release mechanism 139 from its normally locked position to an unlocked position.

Figure 16:
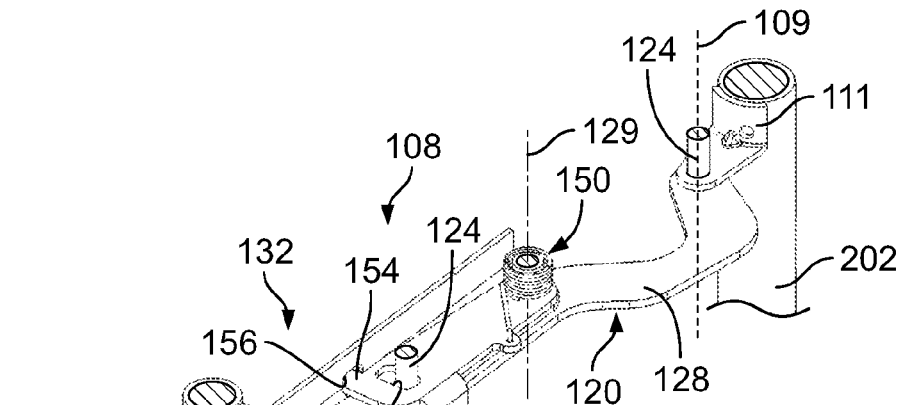
FIGS. 16-18 are perspective, sectional views of the deployment rod, lock-rod, and the horizontal linkage assembly of FIGS. 14 and 15 showing operation of the manual release mechanism to permit relative movement between a first and second link of the linkage assembly.
Figure 17:
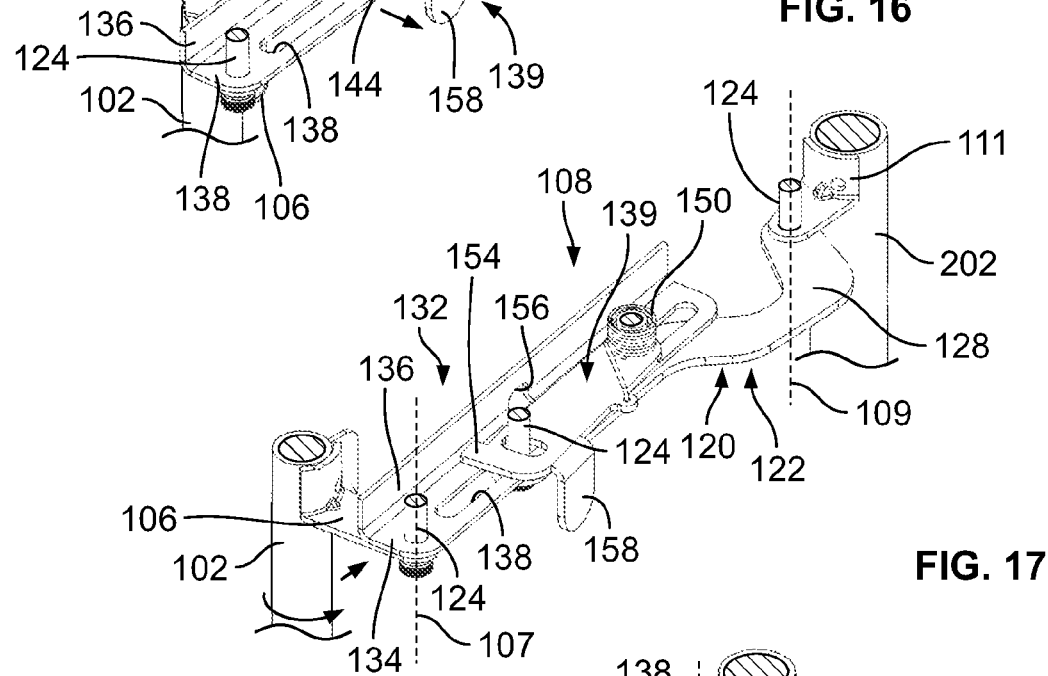
Figure 18:
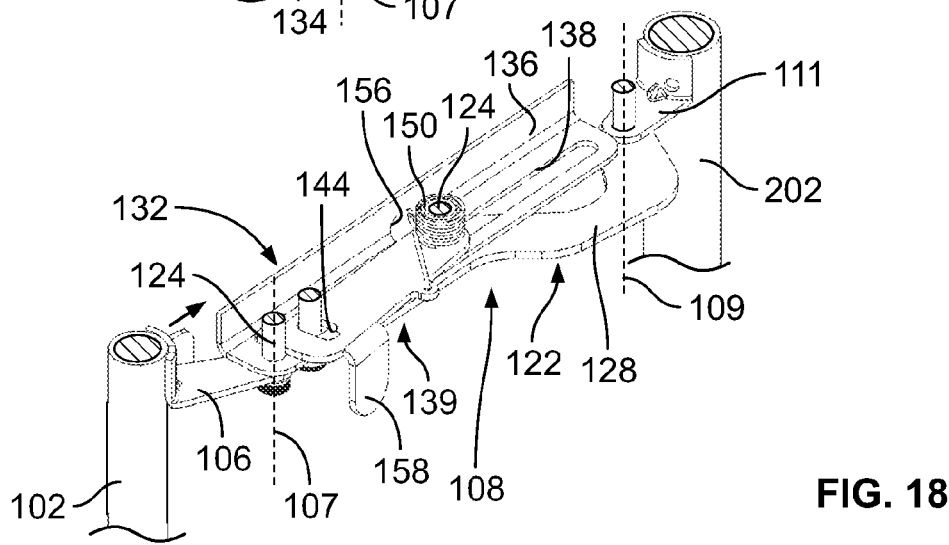

As shown in FIG. 14, for example, the manual release lever 141 is in its locked position such that the detent 154 is received with in the slot 156 of the second link 132 in order to cause the first and second links 120, 132 to move laterally in unison with each other as the lock-rod 202 of the door locking mechanism 200 is rotated. However, by pulling the tab 158 of the manual release lever 141 against the bias of the spring 150 away from the back wall 136 of the second link 132, the manual release lever 141 is moved to an unlocked position whereby the detent 154 is removed from within the slot 156 of the second link 132 (as shown in FIG. 16) to allow the second link 132 to move laterally relative to the first link 120. As shown in FIGS. 17 and 18, once the manual release lever 141 is moved to the unlocked position shown in FIG. 16 and the detent 154 is removed from within the slot 156, a user may grab the side panel 30 and pivot the side panel 30 about the axis 45 toward the rear door 14 to move the first link 44 (and support arm 112) of the linkage assemblies 37, 42 and the deployment rod 102 approximately 100 degrees to cause the second link 132 to slide laterally toward the lock-rod 202 of the door locking mechanism 200 without moving the first link 120 or rotating the lock-rod 202. Movement of the side panel 30 to the fully-stowed position including movement of the support arm 112 to its out-of-the-way position allows the top panel 32 to pivot downwardly to its folded and fully-stowed position. Thus, the side and top panels 30, 32 of the rear drag reduction system 12 are moved to their fully-deployed positions without the use of the door locking mechanism 200.

Alternatively, a user may position the top and side panels 32 in their fully-folded position with the door locking mechanism 200 in its locked position by first rotating the handle 204 of the door locking mechanism 200 approximately 180 degrees in order to rotate the lock-rod 202 of the door locking mechanism 200 approximately 180 degrees to fold the side and top panels 30, 32 to their fully-folded position (as is discussed in FIGS. 5A-8 above). If the user wants to maintain the side and top panels 30, 32 in their fully-folded positions while maintaining the doors 14 of the trailer 10 in a locked position, the user may pull the manual release lever 141 to the unlocked position whereby the detent 154 is removed from within the slot 156 of the second link 132 to allow the first and second links 120, 132 to move relative to each other. With the manual release lever 141 in the unlocked position, the user may then manually rotate the handle 204 back to its original, locked position in order to rotate the lock-rod 202 approximately 180 degrees in a clockwise direction toward the locked position without moving or otherwise manipulating the deployment rod 102 and top or side panels 30, 32. In other words, the handle 204 may be moved back to the locked position while maintaining the top and side panels 30, 32 in their fully-folded positions. As such, the side and top panels 30, 32 are positioned in their fully-folded positions while the door locking mechanism 200 is in the locked position.

When the top and side panels 30, 32 are in their collapsed, of fully-stowed, positions and the manual release mechanism 139 is in the unlocked position shown in FIG. 18 such that the second link 132 has been laterally moved toward the lock-rod 202 relative to the first link 120 which remained generally stationary, the manual release mechanism 139 will automatically return to its locked position upon activation by the user of the door locking mechanism 200 to the unlocked position. That is, as the handle 204 and the lock-rod 202 are rotated counterclockwise approximately 180 degrees to an unlocked position, the bracket 111 is rotated therewith thus pulling the first link 120 (and the manual release mechanism 139 coupled thereto) laterally relative to the second link 132 until the detent 154 of the manual release mechanism 139 is aligned with the slot 156 of the second link 132 and biased by the spring 150 to be received therein to once again position the manual release lever 141 in its locked position to prevent relative movement between the first and second links 120, 132. Accordingly, when the user next locks the door locking mechanism 200, as described in detail above, the deployment rod 102 of the folding mechanism 100 will be urged to rotate with the lock-rod 202 to move the support arm 112 to its rearwardly-extending position thus moving the top and side panels 30, 32 to their fully-deployed positions once again.

Figure 19A:
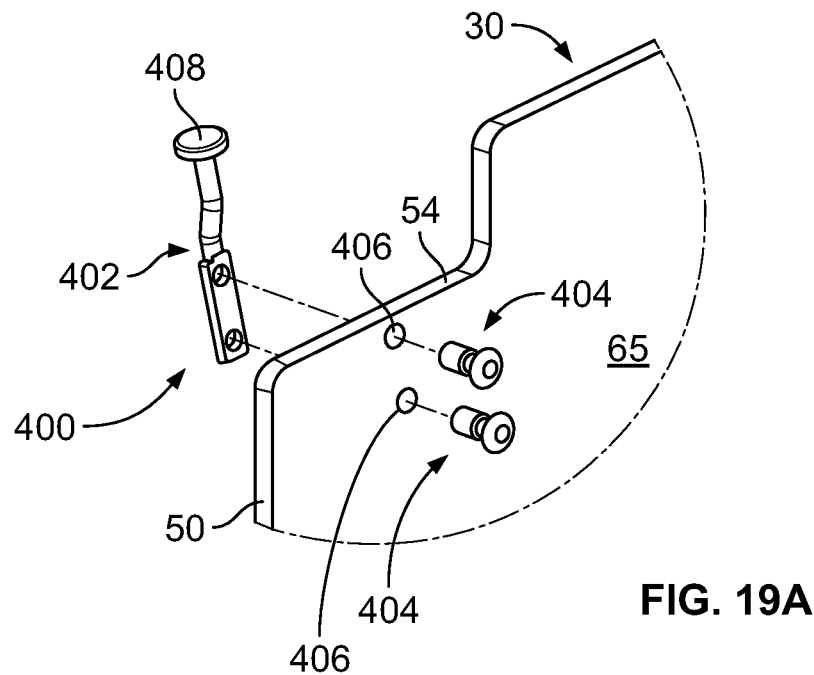
FIG. 19A is an exploded, perspective view of the upper, outer corner of the side panel showing a lock assembly coupled thereto.
Figure 19B:
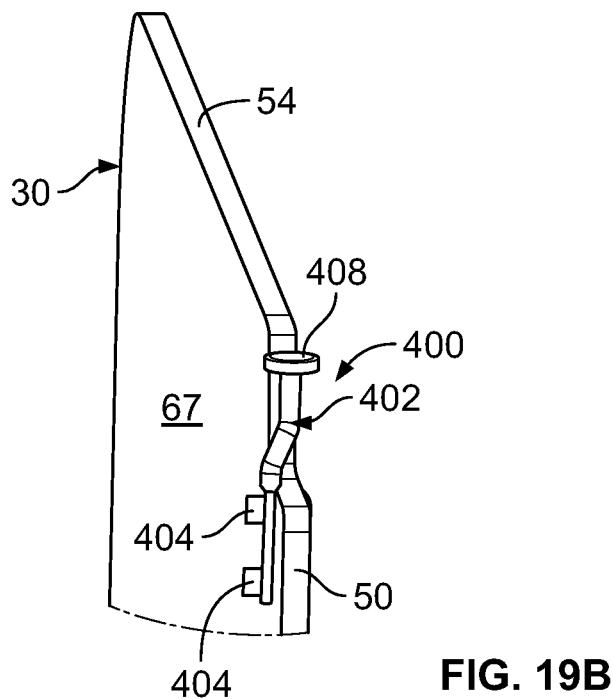
FIG. 19B is a perspective view of the lock assembly.

Looking now to FIGS. 19A and 19B, in order to prevent vertical motion of the top panel 32 relative to the side panel 30, a lock assembly 400 is provided. The lock assembly 400 provides a mechanical interlock between the side panel 30 and the top panel 32 and may be used in lieu of or in conjunction with the cables 77, 79. In particular the lock assembly 400 includes a catch, or pin hook, 402 illustratively coupled to the outside surface 67 of the side panel 30 via fasteners 404 received through apertures 406 formed in an upper, outer portion of the side panel 30 near a notch formed in the upper edge 54 and the outer edge 50 of the side panel 30. Illustratively, the catch 402 is bent such that once coupled to the outer surface 67 of the side panel 30, the head 408 of the catch 402 is generally aligned with the upper edge 54 of the side panel 30. Illustratively, the catch 402 may alternatively be coupled to the inside surface 65 of the side panel 30 and similarly bent to align the head 408 of the catch 402 with the upper edge 54 of the side panel 30. As shown in FIG. 19B, the head 408 of the catch 402 is also not generally positioned higher than the top edge 54 of the side panel 30. The lock assembly 400 also includes a keeper (not shown) coupled to the bottom surface 31 of the top panel 32.

The keeper illustratively includes a portion spaced-apart from the bottom surface 31 of the top panel 32 and including a slot formed therein. In operation, as the side panel 30 and top panel 32 are moved from their fully-stowed positions to their fully-deployed positions, the head 408 of the catch 402 is slid into the slot of the keeper to position the head between the bottom surface 31 of the top panel 32 and the keeper to prevent upward movement of the top panel 32 relative to the side panel 30.

Illustratively, as noted above, while securement cables 77, 79 are shown and described herein, it should be understood that the lock assembly 400 may be used with or without the cables 77, 79. Illustratively, while the particular lock assembly 400 is described herein, it is within the scope of this disclosure for the rear drag reduction system 12 to include any suitable lock assembly to prevent upward movement of the top panel 32 relative to the side panel 30 when the panels 32, 30 are in their fully-deployed positions such as, but not limited to, the locking assemblies described and disclosed within U.S. patent Ser. No. 14/709,980 filed May 12, 2015 and titled AERODYNAMIC REAR DRAG REDUCTION SYSTEM FOR A TRAILER, the entirety of which is hereby incorporated herein.

As noted above, when the drag reduction system 12 is in the deployed position the swing doors 14 of the trailer 10 are closed. The top and side panels 32, 30 of each of the two drag reduction systems 12 extend outwardly from the rear frame 13 and rear swing doors 14 in order to direct and smooth air flow around the rear end of the trailer 10 as the trailer 10 travels down the highway, for example. When the trailer 10 is not traveling on the road and it is necessary for a user or operator to open the rear doors 14 of the trailer 10 in order to gain access to the storage area of the storage container 15, the user need only unlock and open the doors 14 in the usual or typical manner and the drag reduction system 12 coupled to each door 14 automatically moves to its stowed position.

Further, in order to move the drag reduction system 12 to the deployed position, the user need only close and lock the rear doors 14 and the system 12 coupled to each door 14 automatically moves to its deployed position upon movement of the door locking mechanism 200 to the locked position. In other words, it is not necessary to perform an extra step to move the drag reduction system 12 to the closed position prior to opening the trailer doors 14 or to move the drag reduction system 12 to the opened position after closing the doors 14. Rather, the drag reduction system 12 automatically moves to the fully-stowed position upon unlocking the door 14 to which the drag reduction system 12 is attached, and automatically moves to the fully-deployed position upon locking the door 14 to which the drag reduction system 12 is attached. It should be understood that the drag reduction systems 12 of the present disclosure may be used alone or in conjunction with other drag reduction systems such as, for example, aerodynamic side skirts such as those disclosed in U.S. Pat. No. 8,177,286 and U.S. Pat. No. 8,783,758, for example, the entirety of each of which is incorporated herein by reference.

It should be understood that while the particular folding mechanism 100 is shown and described herein, alternative folding mechanisms such as those shown and described in U.S. patent application Ser. No. 15/044,220 may be provided as well. In fact, it should be understood that while the illustrative folding mechanism 100 of the present disclosure is shown and described herein in order to "slave" the actuation or movement of the side and top panels 30, 32 disclosed herein to the movement of the door locking mechanism 200, it is within the scope of this disclosure to provide any suitable configuration of linkage type mechanisms between the lock-rod 202 and the side and top panels 30, 32 to translate the rotational motion of the lock-rod 202 of the door locking mechanism 200 to movement of the side and top panels 30, 32 between fully-deployed and fully-folded positions. In other words, it should be understood that the rear drag reduction system 12 includes any suitable folding mechanism coupled to the door locking mechanism 200 of the trailer 10 to automatically actuate and move the side and top panels 30, 32 of the rear drag reduction system 12 between fully-deployed and fully-folded positions via movement of the lock-rod 202 of the door locking mechanism 200. It should also be understood that movement of the top panel 32 of the rear the rear drag reduction system 12 between the fully-deployed and fully-stowed positions may be accomplished solely via movement of the side panel 30 between its fully-deployed and fully-stowed positions or solely via movement of the support roller 113 on the support arm 112. In other words, only one of these supporting components upon which the top panel 32 is supported are necessary to move the top panel 32 between its fully-deployed and fully-stowed positions.

Illustratively, each wall panel 30, 32 is made of a composite material. For example, the composite material may include a plastic core and metal outer skins coupled to the plastic core. Such a composite material provides a rigid, but lightweight and durable material. Illustratively, for example, each wall panel 30, 32 may be made of a DURAPLATE® composite panel provided by Wabash National Corporation of Lafayette, Ind. DURAPLATE® composite panels are constructed of a high-density polyethylene plastic core bonded between two high-strength steel skins.

The inner and outer skins respectively may be formed of a metal or metallic composition, examples of which include, but should not be limited to aluminum, galvanized steel, full hardened steel, such as AISI Grade E steel, or the like. In one illustrative embodiment, for example, the outer skin is formed of ASTM G90 galvanized steel, and the inner skin is formed of ASTM G40 galvanized steel. In alternative embodiments, the inner and/or outer skins respective may be formed of other rigid, semi-rigid, metallic or non-metallic materials. Illustratively, the composite material (i.e., panels 30, 32) is approximately between 0.08 inch and 0.20 inch thick, with a preferred thickness of approximately 0.10 inch thick. While the illustrative panels 30, 32 disclosed herein are each made of the particular composite material described above, it should be understood that other suitable composite materials may be used as well. For example, the panels 30, 32 may also be made from a plastic pultrusion with fiber reinforcements embedded inside the polymer material. The reinforcement fibers may be made from glass, carbon, and/or other suitable materials, for example.

It should be further understood that while the illustrative panels 30, 32 disclosed herein are made from a composite, the panels 30, 32 may alternatively be formed from a non-composite material such as a sheet made from a metal, metal alloy, or plastic, for example. The panels 30, 32 may be made from ferrous or nonferrous materials including plastics or composites incorporating a combination of ferrous and/or nonferrous materials thereof. In particular, an alternative panel (not shown) may be made from galvanized steel. Of course, it is within the scope of this disclosure to include non-galvanized steel sheets, or other such non-composite panels, of any suitable thickness as well.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected. In particular, it should be understood that the while certain illustrative top panels are disclosed herein, the rear drag reduction system of the present disclosure may include any suitable top and side panel configured to move between a fully-deployed and a fully-folded position. Further, the rear drag reduction system of the present disclosure may include any suitable folding mechanism coupled to the door locking mechanism 200 of the trailer 10 to automatically move the side and top panels between the fully-deployed and fully-stowed positions. Finally, the folding mechanism of the present disclosure may include any suitable manual release mechanism to functionally uncouple the folding mechanism from the door locking mechanism of the trailer 10.

What is claimed is:

1. An aerodynamic rear drag reduction system configured to be coupled to a rear frame assembly of a trailer including a rear frame and a rear swing door, the drag reduction system comprising: a side panel configured to be coupled to the rear swing door to extend generally vertically at least partially along a height of the trailer; and a folding mechanism coupled to the side panel to move the side panel between (i) a fully-deployed position wherein the side panel is configured to extend generally rearwardly away from the rear end of the trailer and (ii) a fully-stowed position wherein an inner surface of at least a portion of the side panel is configured to lie generally adjacent the rear swing door, wherein the folding mechanism is configured to be coupled to a door locking mechanism of the trailer for movement therefrom; wherein the folding mechanism is automatically actuated as a result of movement of the door locking mechanism.

2. The aerodynamic rear drag reduction system of claim 1, wherein movement of a handle of the door locking mechanism from a locked position to an unlocked position automatically moves the side panel form the fully-deployed position to the full-stowed position.

3. The aerodynamic rear drag reduction system of claim 1, wherein the folding mechanism is configured to be coupled to a lock-rod of the door locking mechanism, and wherein rotational movement of the lock-rod automatically actuates the folding mechanism.

4. An aerodynamic rear drag reduction system configured to be coupled to a rear frame assembly of a trailer including a rear frame and a rear swing door, the drag reduction system comprising:
a side panel configured to be coupled to the rear swing door to extend generally vertically at least partially along a height of the trailer; and
a folding mechanism coupled to the side panel to move the side panel between (i) a fully-deployed position wherein the side panel is configured to extend generally rearwardly away from the rear end of the trailer and (ii) a fully-stowed position wherein an inner surface of at least a portion of the side panel is configured to lie generally adjacent the rear swing door,
wherein the folding mechanism is configured to be coupled to a door locking mechanism of the trailer for movement therefrom,
wherein the folding mechanism includes (i) a first linkage assembly configured to be coupled to a vertical lock-rod of a door locking mechanism, (ii) a vertically-extending deployment rod coupled to the first linkage assembly, and (iii) a second linkage assembly coupled at one end to the vertically-extending deployment rod and at another end to the side panel.

5. The aerodynamic rear drag reduction system of claim 4, wherein the second linkage assembly includes (i) a first link coupled to the deployment rod for rotational movement therewith, and (ii) a second link pivotably coupled at a first end to the first link and pivotably coupled at a second end to the side panel.

6. The aerodynamic rear drag reduction system of claim 1, further comprising a top panel configured to be coupled to a top portion of the rear swing door of the trailer to extend generally horizontally at least partially along a top portion of the rear frame assembly of the trailer, wherein the top panel is movable between (i) a fully-deployed position wherein the top panel is configured to extend generally rearwardly away from the rear end of the trailer and a top edge of the side panel is spaced inwardly from an outer edge of the top panel and (ii) a fully-stowed position wherein the top panel is configured to lie generally adjacent to an outer surface of the side panel.

7. The aerodynamic rear drag reduction system of claim 6, wherein the folding mechanism includes a support arm engaged with a bottom surface of the top panel when the top panel is in the fully-deployed position.

8. The aerodynamic rear drag reduction system of claim 6, wherein the top panel is positioned on top of the side panel and the bottom surface of the top panel engages the outer surface of the side panel when the top and side panels are each in the fully-stowed positions.

9. An aerodynamic rear drag reduction system configured to be coupled to a rear frame assembly of a trailer including a rear frame and a rear swing door, the drag reduction system comprising:
a top panel configured to be coupled to the rear swing door of the trailer to extend generally horizontally at least partially along a width of the trailer;
a side panel configured to be coupled to the rear swing door to extend generally vertically at least partially along a height of the trailer; and
a folding mechanism directly engaged with the top panel and the side panel and configured to move the top and side panels between a fully-deployed position wherein the top and side panels are configured to extend generally rearwardly away from the rear end of the trailer and a fully-stowed position wherein the top and side panels are configured to lie generally adjacent the rear swing door,
wherein the top panel is supported by both the side panel and the folding mechanism when the top panel is in the fully-deployed position, and an outer surface of the side panel is spaced inwardly from an outer edge of the top panel when the top panel is in the fully-deployed position.

10. The aerodynamic rear drag reduction system of claim 9, wherein a support arm of the folding mechanism moves along a bottom surface of the top panel as top panel moves between the fully-deployed and fully-stowed positions.

11. An aerodynamic rear drag reduction system configured to be coupled to a rear frame assembly of a trailer including a rear frame and a rear swing door, the drag reduction system comprising:
a top panel configured to be coupled to the rear swing door of the trailer to extend generally horizontally at least partially along a width of the trailer;

a side panel configured to be coupled to the rear swing door to extend generally vertically at least partially along a height of the trailer; and a folding mechanism directly engaged with the top panel and the side panel and configured to move the top and side panels between a fully-deployed position wherein the top and side panels are configured to extend generally rearwardly away from the rear end of the trailer and a fully-stowed position wherein the top and side panels are configured to lie generally adjacent the rear swing door, wherein the top panel is supported by both the side panel and the folding mechanism when the top panel is in the fully-deployed position, and an outer surface of the side panel is spaced inwardly from an outer edge of the top panel when the top panel is in the fully-deployed position, and wherein the folding mechanism includes (i) a vertical deployment rod configured to be coupled to a vertical lock-rod of a door locking mechanism of the trailer for rotational movement with the lock-rod, and (ii) a linkage assembly coupled to the deployment rod and the side panel to move the side panel between the fully-deployed and fully-stowed positions.

12. The aerodynamic rear drag reduction system of claim 11, wherein the linkage assembly includes (i) a first link rigidly coupled at one end to the deployment rod for rotational movement therewith and (ii) a second link pivotably coupled at a first end to the distal end of the first link and pivotably coupled at a second end to the side panel.

13. The aerodynamic rear drag reduction system of claim 12, wherein the first link extends generally rearwardly and the second link extends generally horizontally when the side panel is in the fully-deployed position.

14. The aerodynamic rear drag reduction system of claim 11, wherein the second link is configured to push against the side panel when the lock-rod is rotated in a counter-clockwise direction.

15. The aerodynamic rear drag reduction system of claim 11, wherein the linkage assembly is configured to support the top panel thereon when the top panel is in the fully-deployed position.

16. The aerodynamic rear drag reduction system of claim 11, wherein rotation of the lock-rod causes rotation of the vertical deployment rod, and rotation of the vertical deployment rod urges the linkage assembly to move the side panel between the fully-stowed and fully-deployed positions.

17. The aerodynamic rear drag reduction system of claim 9, further comprising a limit strap coupled at one end to the side panel and configured to be coupled at another end to the rear frame assembly of the trailer, wherein the limit strap prevents the side panel from moving beyond a predetermined location when in the fully-deployed position.

18. The aerodynamic rear drag reduction system of claim 9, further comprising a bumper coupled to the side panel and configured to engage the linkage assembly when the side panel is in the fully-stowed position, wherein the bumper is configured to maintain a minimum angle between the side panel and the linkage assembly when the side panel is in the fully-stowed position.

19. A method of operating a rear drag reduction system configured to be coupled to a rear frame assembly of a trailer including a rear frame and a rear swing door, the method comprising:

automatically moving a top panel of the rear drag reduction system and a side panel of the rear drag reduction system from a fully-deployed position wherein the top and side panels are configured to extend generally reawarwadly away from the rear end of the trailer to a fully-stowed position wherein the top and side panels are configured to lie generally adjacent the rear portion of the trailer upon movement of a door locking mechanism of the trailer from a locked position to an unlocked position.

* * * * *